United States Patent
Shouji et al.

(10) Patent No.: US 7,301,973 B2
(45) Date of Patent: Nov. 27, 2007

(54) METHOD AND UNIT FOR SETTING A WAVELENGTH TO A TUNABLE LASER

(75) Inventors: Takuma Shouji, Kawasaki (JP); Eiji Iida, Kawasaki (JP); Miwa Taniguchi, Kawasaki (JP); Tomoyuki Kanzaki, Kawasaki (JP); Kazuaki Nagamine, Kawasaki (JP); Toshihiro Suzuki, Kawasaki (JP); Shingo Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 451 days.

(21) Appl. No.: 10/967,294

(22) Filed: Oct. 19, 2004

(65) Prior Publication Data
US 2005/0271090 A1    Dec. 8, 2005

(30) Foreign Application Priority Data
Jun. 4, 2004    (JP) .............................. 2004-166866

(51) Int. Cl.
H01S 3/10    (2006.01)
H01S 3/00    (2006.01)
(52) U.S. Cl. ...................................... 372/20; 372/38.02
(58) Field of Classification Search ...................... None
See application file for complete search history.

(56) References Cited

U.S. PATENT DOCUMENTS 6,529,531 B1 *   3/2003   Everage et al. ............... 372/20
6,618,401 B2 *   9/2003   Tanimoto et al. ............. 372/20
2001/0019562 A1 *  9/2001   Kai et al. ..................... 372/20
2002/0181519 A1 * 12/2002   Vilhelmsson et al. ......... 372/32

FOREIGN PATENT DOCUMENTS

| EP | 1130711 | 9/2001 |
|---|---|---|
| JP | 2001-196690 | 7/2001 |
| JP | 2002-324933 | 11/2002 |

* cited by examiner

*Primary Examiner*—Minsun Oh Harvey
*Assistant Examiner*—Phillip Nguyen
(74) *Attorney, Agent, or Firm*—Staas & Halsey LLP

(57) ABSTRACT

When a tunable laser is operating at any one of the different wavelengths, wavelength data is sampled and stored in a memory device. In the case where the same operating wavelength as a wavelength hitherto operated needs to be reset to the tunable laser, the wavelength data stored in the memory device is set to the tunable laser. This makes it possible to avoid a shift in wavelength due to age degradation of the tunable laser that selectively outputs any one of light signals of different wavelengths in dependence on the wavelength data set to the tunable laser.

17 Claims, 22 Drawing Sheets

METHOD AND UNIT FOR SETTING A WAVELENGTH TO A TUNABLE LASER

CROSS REFERENCE TO RELATED APPLICATIONS

This application is based on and hereby claims priority to Japanese Application No. 2004-166866 filed on Jun. 4, 2004 in Japan, the contents of which are hereby incorporated by reference.

BACKGROUND OF THE INVENTION

1. Field of the Invention

The present invention relates to a method and unit for setting a wavelength to a tunable laser that is used in a transponder unit provided in an optical transmission unit.

2. Description of the Related Art

In optical transmission techniques, a wavelength-division multiplexing (WDM) technique to transmit light signals of different wavelengths has lately been put to practical use and is increasingly evolving. For instance, as shown in FIG. 22, a WDM transmission unit includes a WDM section 100 and one or more transponder units 104. The WDM section 100 consists of a demultiplexing section (DMUX section) 101, a switching fabric (SW fabric) 102, and a multiplexing section (MUX section) 103. The transponder units 104 are connected with other low-speed transmission units and routers.

In the WDM section 100, the DMUX section 101 receives a wavelength-division multiplexed (WDM) light signal through a basic trunk and separates the WDM light signal into light signals of different wavelengths. The switching fabric 102 changes the destination of a light signal input for each wavelength, in the unit of a wavelength. For example, by provisioning, some of the light signals of different wavelengths from the DMUX section 101 can be dropped to the transponder units 104 or directed to the MUX section 103, and signals from the transponder units 104 can be added to the MUX section 103. The MUX section 103 combines the light signals of different wavelengths output from the switching fabric 102, into one WDM light signal. The WDM light signal is output onto a basic trunk.

On the other hand, the transponder unit 104 receives a light signal of one wavelength before multiplexing or after demultiplexing, and converts or monitors it for users. The transponder unit 104 has, for example, the function of performing the alarm/performance monitoring, line switching, and digital wrapping of a signal dropped from the WDM section 100 (DMUX section 101) or output from a downstream low-speed transmission unit, and the function of converting the wavelength of a light signal dropped from the WDM section 100, to a wavelength (e.g., 1.3 μm) for a downstream low-speed transmission unit, or converting the wavelength of a signal from the downstream, to a wavelength (e.g., 1.5 μm) to be added to a WDM light signal on a basic trunk.

For that reason, the transponder unit 104 is typically equipped with a tunable electro/optical (E/O) converter capable of selectively outputting light signals of different wavelength channels. With provisioning to a WDM transmission unit, a wavelength channel that an object transponder unit 104 uses is determined and wavelength data corresponding to that wavelength channel is set to the tunable E/O converter. The tunable E/O converter supplies a voltage, which corresponds to the set wavelength channel, to a built-in laser module after a predetermined time and sends out a light signal of a wavelength coincident with the set wavelength data.

Note that a conventional technique on laser modules is disclosed, for example, in Japanese Laid-Open Patent Publication No. 2001-196690. The object of the technique is to provide a laser system that is capable of stabilizing output wavelengths and making replacement of laser chips economic and easy. This technique makes an interchange of only laser chips easier by housing a laser chip (laser/memory module) and a memory device in different packages. This technique also makes the updating of operation of a new laser chip by a control system easy and quick, by storing the operating parameters (e.g., a laser bias current, a look-up table, etc.) required for the laser chip in the memory device and giving the required calibration value and operating data to the control system.

That is, when replacing an old laser/memory module, data (data about the initial and operating states of a new laser chip) stored in the memory device of a new laser/memory module is extracted and supplied to the control system. In this way, an old laser chip can be replaced with a new laser chip without performing the retest and recalibration of the laser system.

A conventional technique on laser control is disclosed in Japanese Laid-Open Patent Publication No. 2002-324933 by way of example. This technique provides a method of setting the peak value of the light quantity of a laser beam in which the wavelength is converted by a resonator (resonant cavity) formed in a semiconductor laser used as an excitation light source. In a temperature range where the output light quantity of the resonator can peak, temperature is gradually changed and a peak value is detected from the output light quantity data obtained at respective temperatures. A temperature corresponding to the peak value is set as a reference temperature at which the resonator is controlled. In this way, the output of the resonator can be controlled at the temperature where the light quantity peaks. In addition, a current value to the semiconductor laser does not need to be increased in order to compensate for an insufficient light quantity when the resonator is operating at temperatures other than the peak of the light quantity, so it becomes possible to save energy.

However, after long-time use of a tunable E/O converter, when wavelength data is reset to the tunable E/O converter because of insertion or removal of an object transponder unit, a power failure in a WDM transmission unit, resetting by provisioning, etc., the wavelength data at the time of initial setting is set to the tunable E/O converter. For that reason, if the tunable E/O converter is used for many hours, the corresponding relationship between the wavelength data and an actual output wavelength signal will be impaired. Because of this, if the wavelength data at the time of the previous setting is set, there are cases where an expected wavelength signal cannot be sent out.

That is, tunable E/O converters are typically equipped with an automatic wavelength correcting function, and if wavelength data for outputting a target wavelength λn is set to a data setting register provided in the tunable E/O converter, an internal laser diode (LD) emits light. The automatic wavelength correcting function monitors the output wavelength of the LD and checks whether the output wavelength is the target wavelength λn. If it is not the target wavelength λn, the wavelength data is updated so the output wavelength is the target wavelength λn. Whether the output wavelength of the LD is the target wavelength λn is determined by employing a wavelength filter that transmits only light of the target wavelength λn, and measuring the output intensity. In the case of four settable wavelengths, a wavelength filter for transmitting these four wavelengths is employed.

For example, as listed in Table 1, in a tunable E/O converter settable to λ1 to λ4, when the required target wavelength is λ2, initial wavelength data 0x2F8 (equivalent voltage 1.481 V) is set to the tunable E/O converter as wavelength data.

TABLE 1

Initial data for λ1 to λ4 (fixed values)

| Channel No. | Initial data (HEX) | Equivalent voltage (V) |
|---|---|---|
| λ1(1531.90 nm) | 0x400 | 2.000 |
| λ2(1532.68 nm) | 0x2F8 | 1.481 |
| λ3(1533.47 nm) | 0x1A6 | 0.823 |
| λ4(1534.25 nm) | 0x000 | 0.000 |

If the initial wavelength data is set, the LD starts emitting light at a wavelength of λ2, and the wavelength data is updated as needed by the automatic wavelength correcting function. For instance, consider the case where the equivalent voltages corresponding to λ2 and λ3 have become higher than the equivalent voltage of the initial wavelength data by about 0.6 V after long-time use. In this case, the equivalent voltage at the light emission of wavelength λ2 is about 2.0 V, and the equivalent voltage at the light emission of wavelength λ3 is about 1.4 V.

If the initial wavelength data 0x2F8 (equivalent voltage 1.481 V) corresponding to λ2 is reset to the tunable E/O converter because of insertion or removal of an object transponder unit, a power failure in a WDM transmission unit, or resetting by provisioning, the LD will emit light in the vicinity of λ3.

And since the automatic wavelength correcting function measures the output intensity of a wavelength filter that transmits λ1, λ2, λ3, and λ4, λ3 is recognized as the wavelength of a control object. As a result, light is emitted at λ3, not λ2. More specifically, the automatic wavelength correcting function receives the initial wavelength data of λ2, and fluctuates wavelength data in the vicinity of λ2 so that the output intensity of the wavelength filter is the maximum. Therefore, the automatic wavelength correcting function controls wavelength data so the output intensity at λ3 is the maximum.

Thus, the tunable E/O converter automatically updates wavelength data by the automatic wavelength correcting function, but if light is emitted at any one of the settable wavelengths, the light is transmitted through the above-described wavelength filter and the light emission at that wavelength is maintained. The automatic wavelength correcting function does not check whether the output wavelength is a target wavelength, so when the initial wavelength data is set, there is a possibility that depending on a difference between an actual output wavelength and the initial wavelength data, light will be emitted at a different wavelength. If a module capable of measuring an output wavelength is mounted in the tunable E/O converter, it becomes possible to recognize the output wavelength accurately. However, it is fairly difficult to mount the above-described module in the tunable E/O converter from the standpoint of size and cost.

For that reason, when the corresponding relationship between an actual output wavelength and initial wavelength data is impaired because of age degradation, etc., there is a possibility that the tunable E/O converter will recognize a different wavelength as a target wavelength and continue to output a light signal at an erroneous wavelength. As a result, in the worst case, a performance monitor error, signal disconnection, a unit failure, etc., will occur because of a shift in wavelength.

In the technique disclosed in the aforementioned publication No. 2001-196690, data about the initial and operating states of a new laser chip (e.g., a laser bias current, a look-up table, etc.) is stored in a memory device and is supplied to a control system, but after data is supplied, that data is fixedly used in order to operate a laser chip. For that reason, there is a possibility that a shift in wavelength due to age degradation will occur.

On the other hand, since the technique disclosed in the aforementioned publication No. 2002-324933 relates to a method of controlling temperature of an excitation light source (semiconductor laser), a shift in wavelength due to age degradation cannot be avoided.

SUMMARY OF THE INVENTION

The present invention has been made in view of the circumstances described above. Accordingly, it is the primary object of the present invention to avoid a shift in wavelength due to age degradation of a tunable laser that selectively outputs any one of light signals of different wavelengths in dependence on wavelength data that was set to the tunable laser.

To achieve the aforementioned object of the present invention, there is provided a wavelength setting method for a tunable laser which selectively outputs any one of light signals of different wavelengths in dependence on set wavelength data and also corrects the wavelength data automatically to stabilize an output wavelength during operation of the tunable laser. The wavelength setting method comprises a step of sampling wavelength data and storing the wavelength data in a memory device, when the tunable laser is operating at any one of the different wavelengths, and a step of setting the wavelength data stored in the memory device to the tunable laser, when the same operating wavelength as a wavelength hitherto operated needs to be reset to the tunable laser.

In the wavelength setting method of the present invention, the aforementioned wavelength data may be cyclically sampled and stored in the memory device, during the operation of the tunable laser. Also, the wavelength data may be acquired a plurality of times in one cycle. An average value of the acquired wavelength data may be calculated, and the average value may be stored in the memory device.

In the wavelength setting method of the present invention, the aforementioned memory device may comprise two memories. Also, the wavelength data sampled during the operation of the tunable laser may be written to each of the memories or to one of the memories where wavelength data sampled in a previous cycle was not stored, and normal flag information, which indicates that the writing is normally or abnormally completed, may be written to each of the memories or the one memory. Furthermore, when an operating wavelength of the tunable laser is reset, the normal flag information of each of the memories may be checked. Also, one of the memories where the writing is normally completed may be selected, and wavelength data in the selected memory may be set to the tunable laser.

In accordance with the present invention, there is provided a wavelength setting unit for a tunable laser which selectively outputs any one of light signals of different wavelengths in dependence on set wavelength data and also corrects the wavelength data automatically to stabilize an output wavelength during operation of the tunable laser. The wavelength setting unit includes (1) a memory device that stores wavelength data, which are to be set to the tunable laser, according to the wavelengths; (2) wavelength data sampling means that samples wavelength data when the tunable laser is operating at any one of the different wavelengths; (3) wavelength data updating means that updates the wavelength data stored in the memory device by the wavelength data sampled by the wavelength data sampling means; and (4) wavelength setting means that sets the wavelength data updated in the memory device by the wavelength data updating means to the tunable laser, when the same operating wavelength as a wavelength hitherto operated needs to be reset to the tunable laser.

According to the present invention, the present wavelength data is sampled during operation of a tunable laser and is stored. When the wavelength data of the same operating wavelength is reset, the stored wavelength data is used. Therefore, even when the wavelength data of the same operating wavelength needs to be reset after long-term use, wavelength data can be set to the tunable laser in consideration of age degradation. Thus, it becomes possible to avoid a performance monitor error, signal disconnection, and a unit failure due to a shift in wavelength.

BRIEF DESCRIPTION OF THE DRAWINGS

The present invention will be described in further detail with reference to the accompanying drawings wherein.

DESCRIPTION OF THE PREFERRED EMBODIMENTS

[A] Description of an Embodyment

Figure 1:
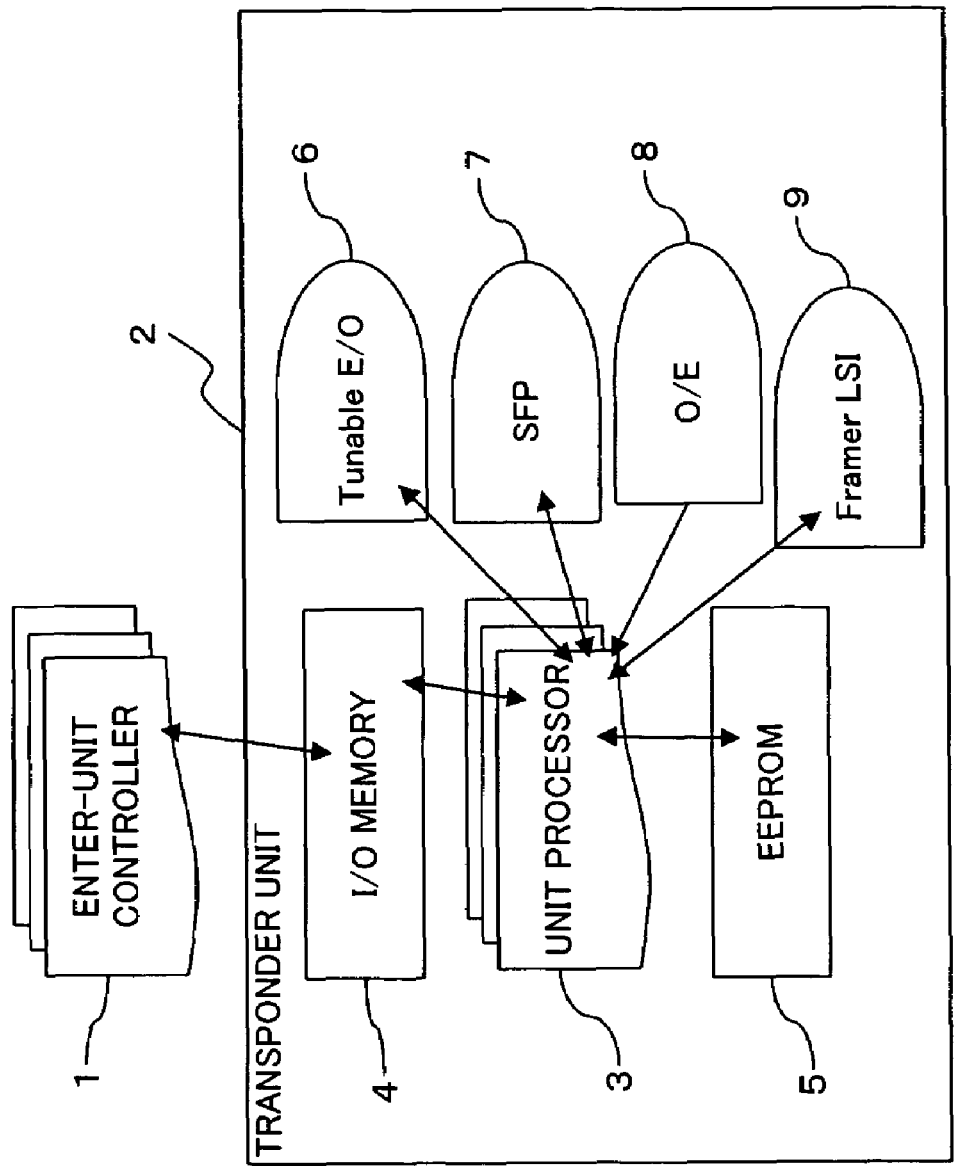
FIG. 1 is a block diagram showing a transponder unit, constructed in accordance with a preferred embodiment of the present invention, which is used in a WDM transmission unit.
Figure 2:
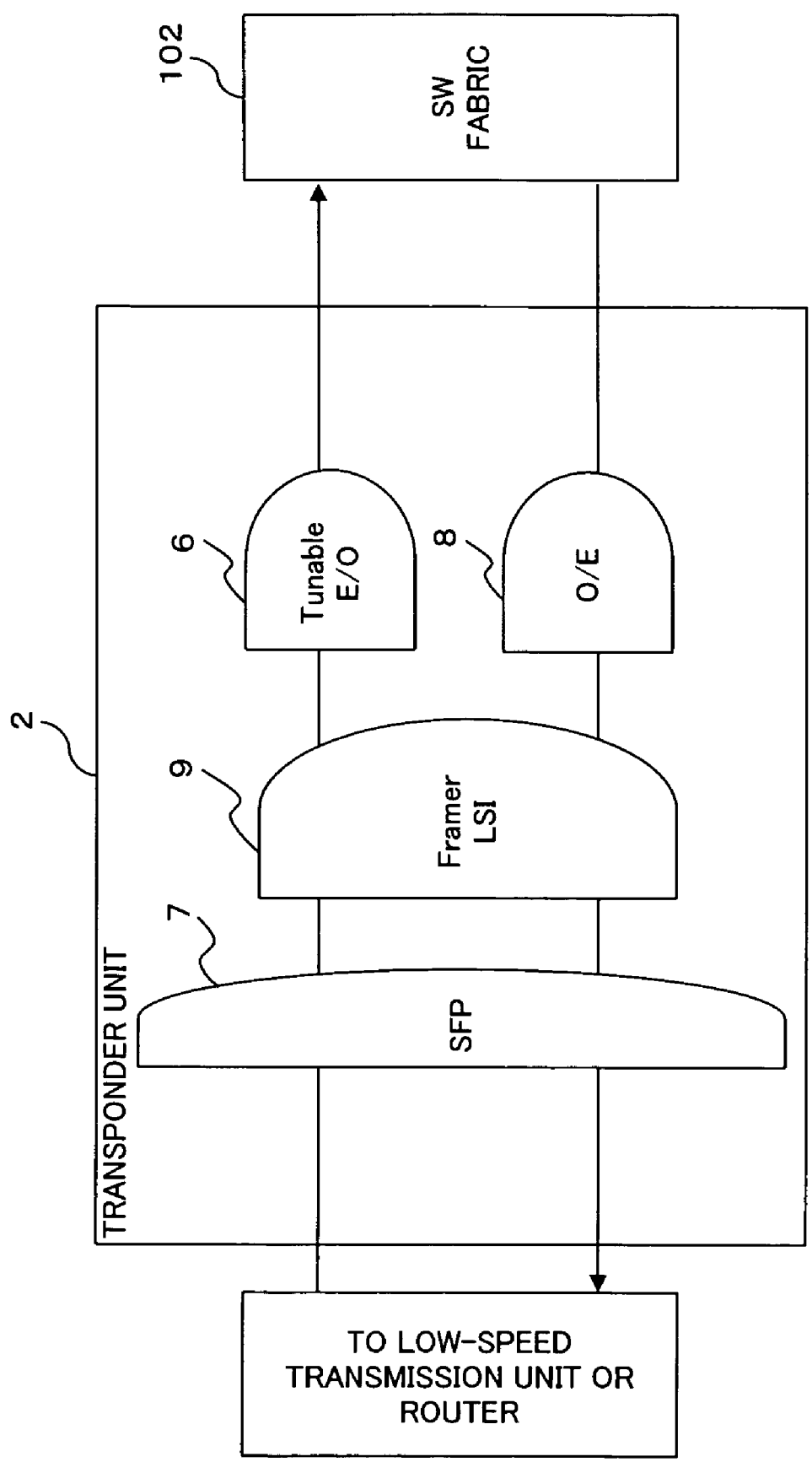
FIG. 2 is a block diagram of the transponder unit shown in FIG. 1.
Figure 22:
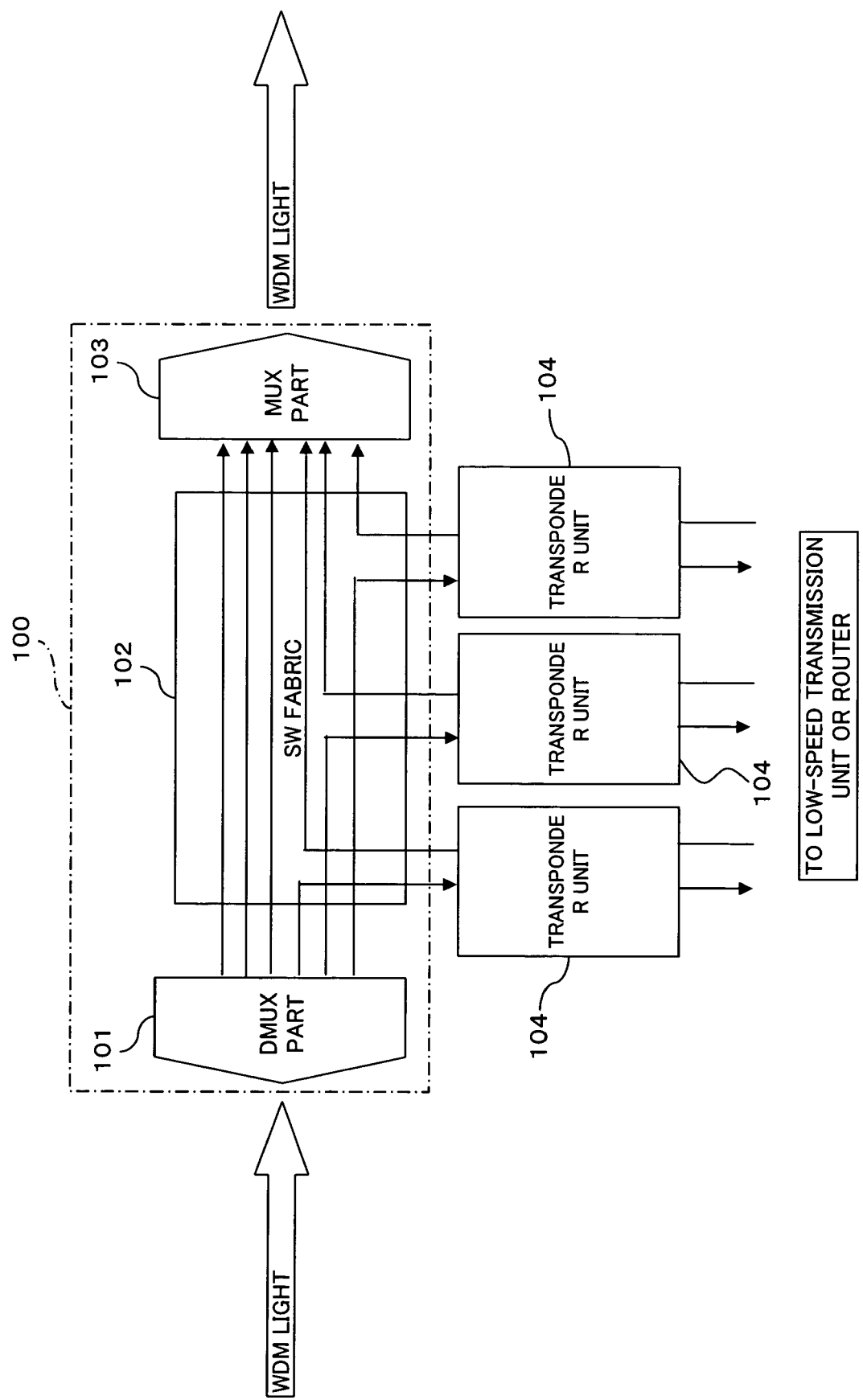
FIG. 22 is a block diagram showing a conventional WDM transmission unit.

Referring now in greater detail to the drawings and initially to FIGS. 1 and 2, there is shown a transponder unit constructed in accordance with a preferred embodiment of the present invention. The transponder unit 2 shown in these figures can also be used as the transponder unit 104 in the WDM transmission unit shown in FIG. 22. The transponder unit 2 consists mainly of a unit processor 3, an input/output (I/O) memory 4, an electrically erasable and programmable read only memory (EEPROM) 5, a tunable E/O converter 6, a small form factor pluggable (SFP) transceiver 7, an O/E converter 8, and a framer LSI 9. In FIG. 1, reference numeral 1 denotes an entire-unit controller (supervisory controller) that controls a WDM transmission unit to which the transponder unit 2 of the present invention is applied, which is able to send information about the transponder unit 2 to the unit processor 3 through the I/O memory 4. Also, in FIG. 2, the unit processor 3, I/O memory 4, and EEPROM 5 are omitted.

The unit processor 3 controls the modules (tunable E/O converter 6, SFP transceiver 7, and framer LSI 9) and EEPROM 5 of the transponder unit 2, in dependence on provisioning information set to the I/O memory 4 by the entire-unit controller 1. Note that the unit processor 3 may be a field programmable gate array (FPGA) circuit, firmware with a CPU, or a mixture of these.

The I/O memory 4 stores the setting information transmitted from the entire-unit controller 1 and also stores information (alarm information, performance monitor (PM) information, etc.) that is to be transmitted to the entire-unit controller 1. That is, the communication between the entire-unit controller 1 and the unit processor 3 is performed through the I/O memory 4.

The EEPROM 5 stores information such as wavelength data required for operation of the tunable E/O converter 6. Note that the EEPROM 5 may be a nonvolatile memory device capable of holding data without being connected with an external power source. For example, it may be flash memory, etc.

The tunable E/O converter 6 performs an E/O conversion on a signal transmitted from the downstream side (low-speed transmission unit or router) to the upstream side (switching fabric 102), as shown in FIG. 2. The tunable E/O converter 6 is constructed so it can select an output wavelength from a plurality of wavelengths (e.g., four wavelengths) in dependence on user's setting.

Figure 3:
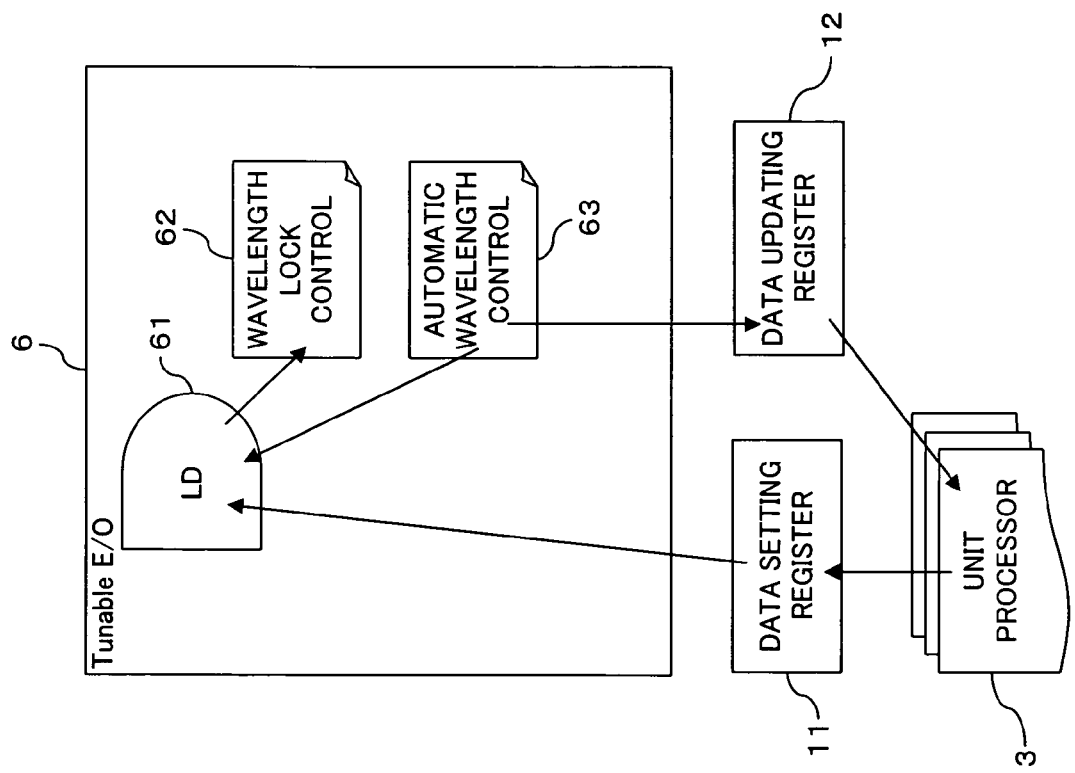
FIG. 3 is a block diagram of the tunable E/O converter shown in FIGS. 1 and 2.

More specifically, the tunable E/O converter 6 is equipped with a laser diode (LD) 61, a wavelength lock controller 62, and an automatic wavelength controller 63, as shown in FIG. 3. If wavelength data is set from the unit processor 3 to a data setting register 11, the LD 61 emits light at a wavelength corresponding to that wavelength data. By monitoring the output wavelength with the wavelength lock controller 62, wavelength data is updated by the automatic wavelength controller 63 so that the output wavelength becomes stable at a target wavelength λn.

That is, if the output wavelength from the LD 61 is not a target wavelength, the automatic wavelength controller 63 changes the wavelength data so the output wavelength becomes a target wavelength, and sets the changed wavelength data to a data updating register 12. The data updating register 12 notifies the unit processor 3 of the changed wavelength data. The unit processor 3 sets the wavelength data set to the data updating register 12 to the data setting register 11. With such an automatic wavelength correcting function, the tunable E/O converter 6 stabilizes an output wavelength being operated, by automatically updating wavelength data. In the preferred embodiment, when the tunable E/O converter 6 can set four wavelengths, whether an output wavelength from the LD 61 is a target wavelength is determined by employing a wavelength filter (optical means) that transmits light of the four wavelengths and blocks light of wavelengths other than those wavelengths.

And the output power (intensity) of the wavelength filter is measured and wavelength data is automatically updated or corrected so that the output power becomes the maximum value.

The SFP transceiver 7, as shown in FIG. 2, is arranged on the downstream side and performs an O/E conversion on a signal transmitted from the downstream side to the upstream side and an E/O conversion on a signal transmitted from the upstream side to the downstream side. In the case where an E/O conversion is made, the SFP transceiver 7 is set, for example, to a wavelength of 1.3 μm for the downstream side. Also, the loss of light from the downstream side to the upstream side is detected by the SFP transceiver 7.

The framer LSI 19 performs the alarm or performance monitoring and overhead control of a signal that was O/E converted. The O/E converter 8 performs the O/E conversion of a signal transmitted from the upstream side to the downstream side.

Operation of the transponder unit 2 of the preferred embodiment constructed as described above will hereinafter be described with reference to FIGS. 4 to 7.

Figure 4:
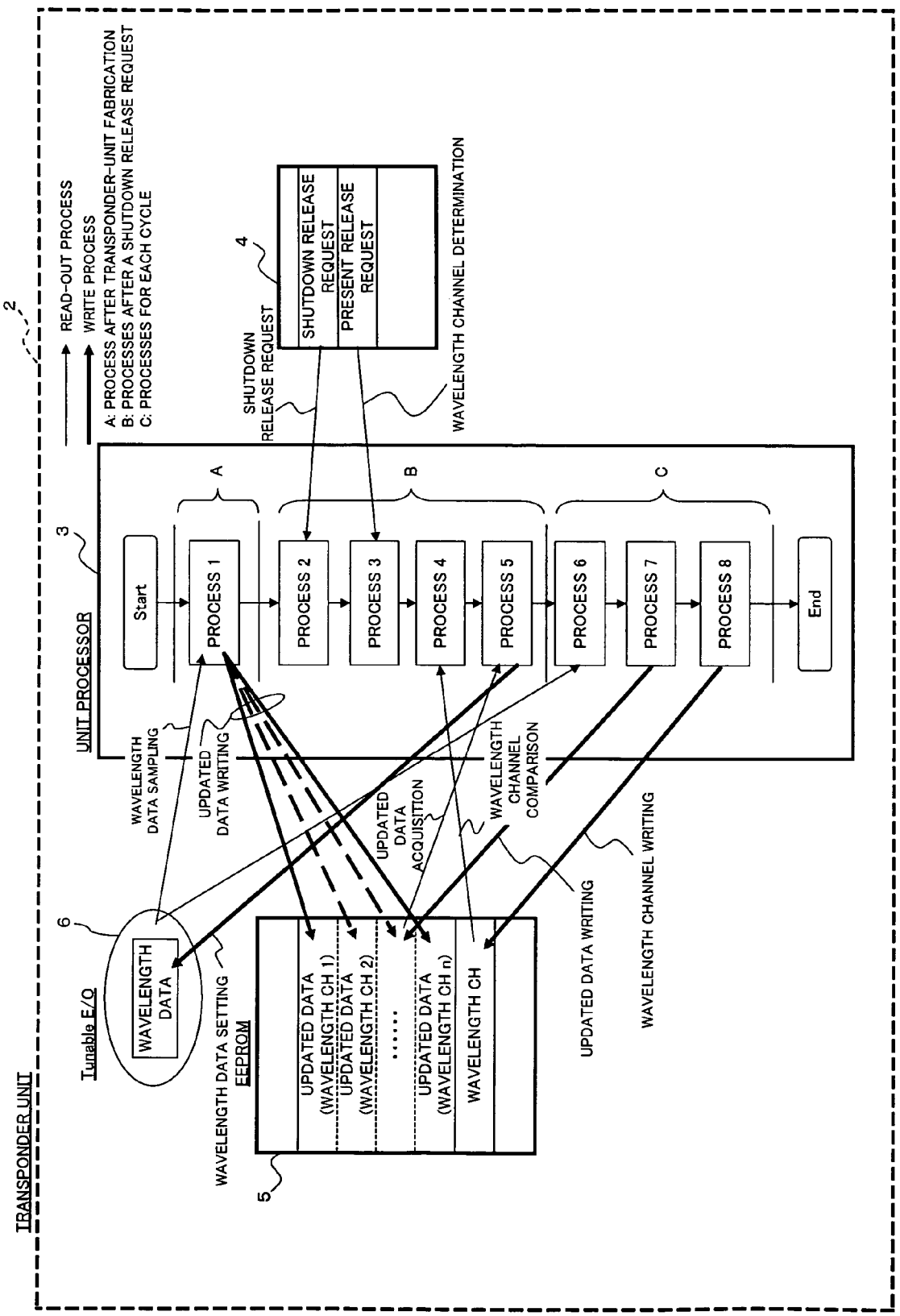
FIG. 4 is a diagram used to explain operation of the transponder unit shown in FIGS. 1 and 2.
Figure 5:
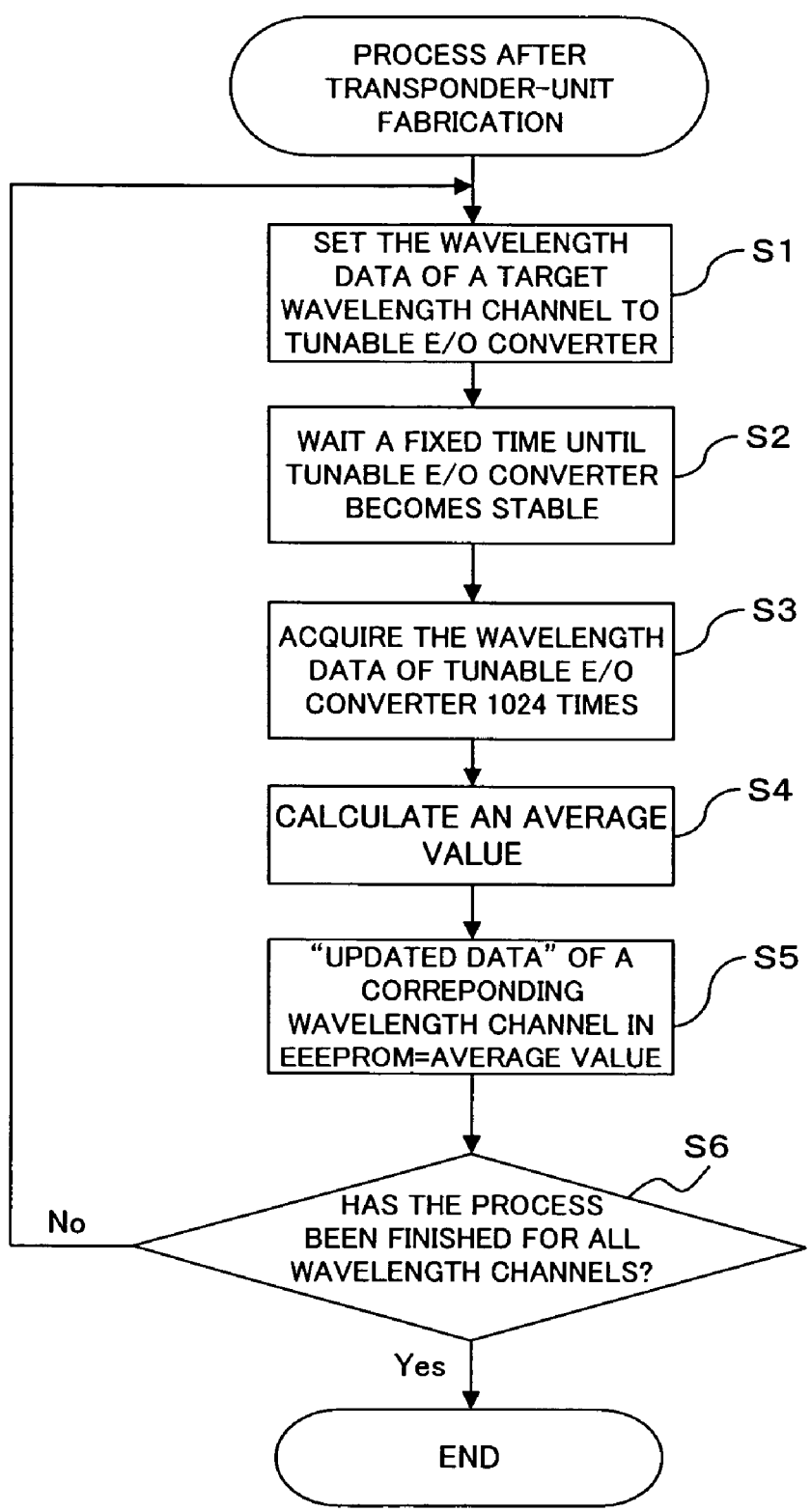
FIG. 5 is a flowchart used to explain the operation (process after transponder-unit fabrication) of the transponder unit shown in FIGS. 1 and 2.

As shown in FIG. 4, the unit processor 3 performs a process A after fabrication of the transponder unit 2. That is, the unit processor 3 samples wavelength data from the data updating register 12 of the tunable E/O converter 6 for each wavelength channel and writes the sampled wavelength data to the EEPROM 5 as updated data of wavelength channels (process 1). More specifically, as shown in FIG. 5, the unit processor 3 sets the wavelength data of a target wavelength channel set from the entire-unit controller 1 to the I/O memory 4, to the data setting register 11 of the tunable E/O converter 6 (step S1), then waits a fixed time until an output wavelength from the LD 61 of the tunable E/O converter 6 is stabilized by the automatic wavelength correcting function (wavelength lock controller 62 and automatic wavelength controller 63) (step S2), then acquires the wavelength data of the tunable E/O converter 6 from the data updating register 12 a predetermined number of times (e.g., 1024 times) (step S3), then calculates an average value of the acquired data (step S4), and stores the calculated average value in the EEPROM 5 as the updated data of that wavelength channel (step S5).

The unit processor 3 repeats the above-described steps S1 to S5 until all wavelength channels are completed, and stores updated data (average values) of wavelength data in the EEPROM 5 for all wavelength channels.

If a shutdown request is sent after normal operation by the entire-unit controller 1 of the WDM transmission unit, also a shutdown release request (i.e., a start request) is sent by the entire-unit controller 1 after the WDM transmission unit is shut down, and information about the request is set to the I/O memory 4, the unit processor 3 performs processes 2 to 5 after the shutdown release request, as shown in FIG. 4.

That is, if the aforementioned shutdown release request is set to the I/O memory 4, the unit processor 3 knows that wavelength data needs to be set to the tunable E/O converter 6 (process 2). The unit processor 3 determines an operating wavelength channel from the provisioning information (the present wavelength channel information set to the I/O memory 4) (process 3), also confirms that it is the same as the wavelength channel (being operated) stored in the EEPROM 5 which is held by the transponder unit 2 (process 4), and acquires the "updated data" of the corresponding wavelength channel stored in the EEPROM 5 and sets the "updated data" to the data setting register 11 of the tunable E/O converter 6 as wavelength data (process 5).

Figure 6:
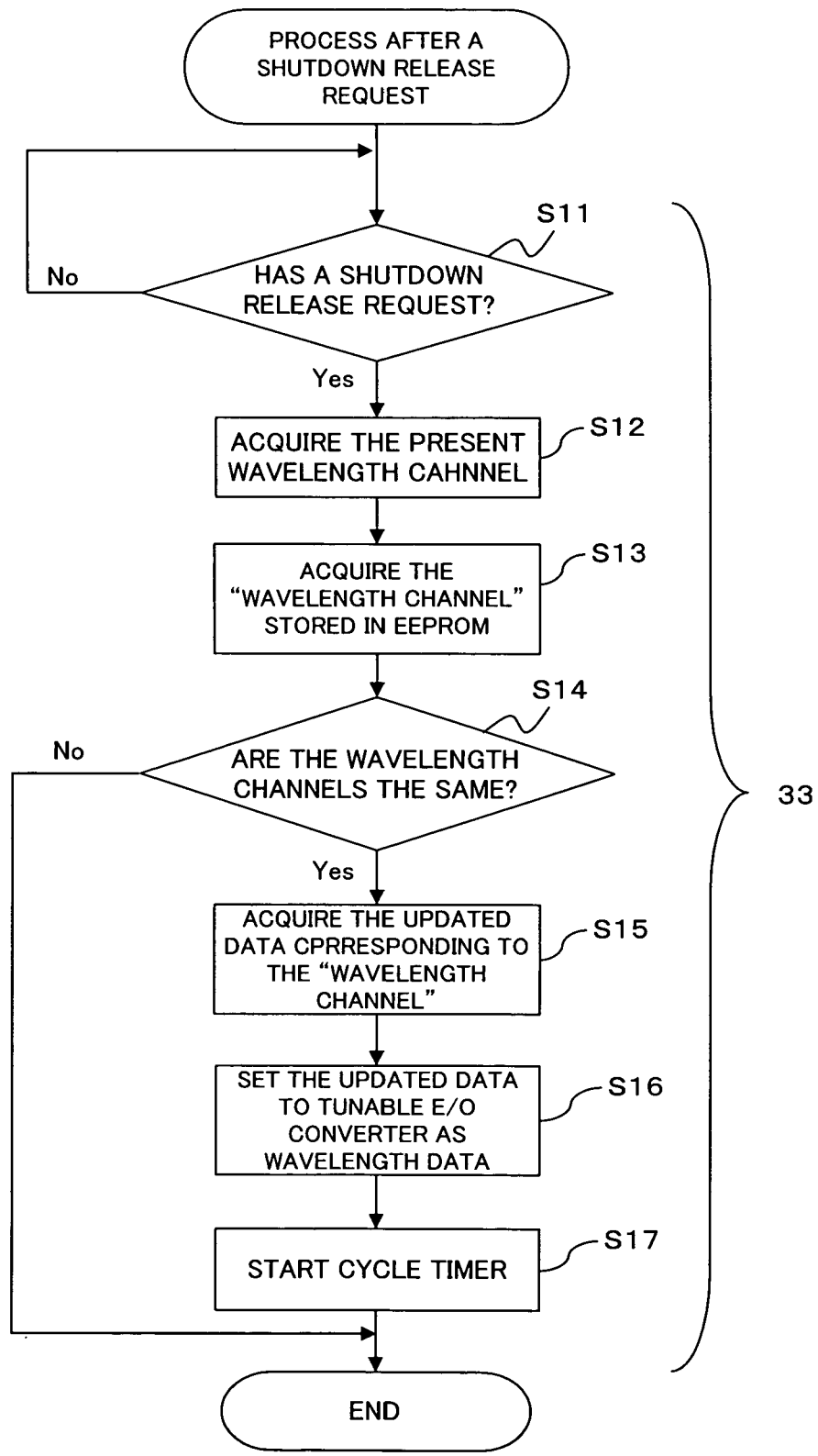
FIG. 6 is a flowchart used to explain the operation (processes after a shutdown release request) of the transponder unit shown in FIGS. 1 and 2.

More specifically, as shown in FIG. 6, the unit processor 3 monitors whether a shutdown release request is set from the entire-unit controller 1 to the I/O memory 4 ("No" route in step S11), then acquires (or determines) the present "wavelength channel information" from the I/O memory 4 if the shutdown release request has been set (step S12), and acquires "wavelength channel information" stored in the EEPROM 5 (step S13). Note that the "wavelength channel information" stored in the EEPROM 5 is information that indicates a wavelength channel at which the LD 61 of the tunable E/O converter 6 has been operated until now.

And the unit processor 3 checks whether the determined wavelength channel is the same as the wavelength channel information acquired from the EEPROM 5 (step S14). If they are the same, that is, if there is no change in the operating wavelength channel of the LD 61 of the tunable E/O converter 6, the unit processor 3 acquires the "updated data" corresponding to that wavelength channel from the EEPROM 5 (step S15), then sets the updated data to the data setting register 11 of the tunable E/O converter 6 as wavelength data (step S16), and starts a cycle timer (step S17). This cycle timer periodically generates a trigger for carrying out processes 6 and 7 shown in FIG. 4. In the aforementioned step S14, when the determined wavelength channel differs from the wavelength channel information acquired from the entire-unit controller 1, the unit processor 3 finishes the sequence of steps ("No" route in step S14).

Thereafter, during normal operation, the unit processor 3 samples the present wavelength data of the tunable E/O converter 6 each time the cycle timer generates a trigger, and calculates an average value of the sampled wavelength data (process 6) and writes the calculated average value to the EEPROM 5 as the "updated data" of the corresponding wavelength channel (process 7). Also, the present wavelength channel is written to the EEPROM 5 as "wavelength channel information" (process 8).

Figure 7:
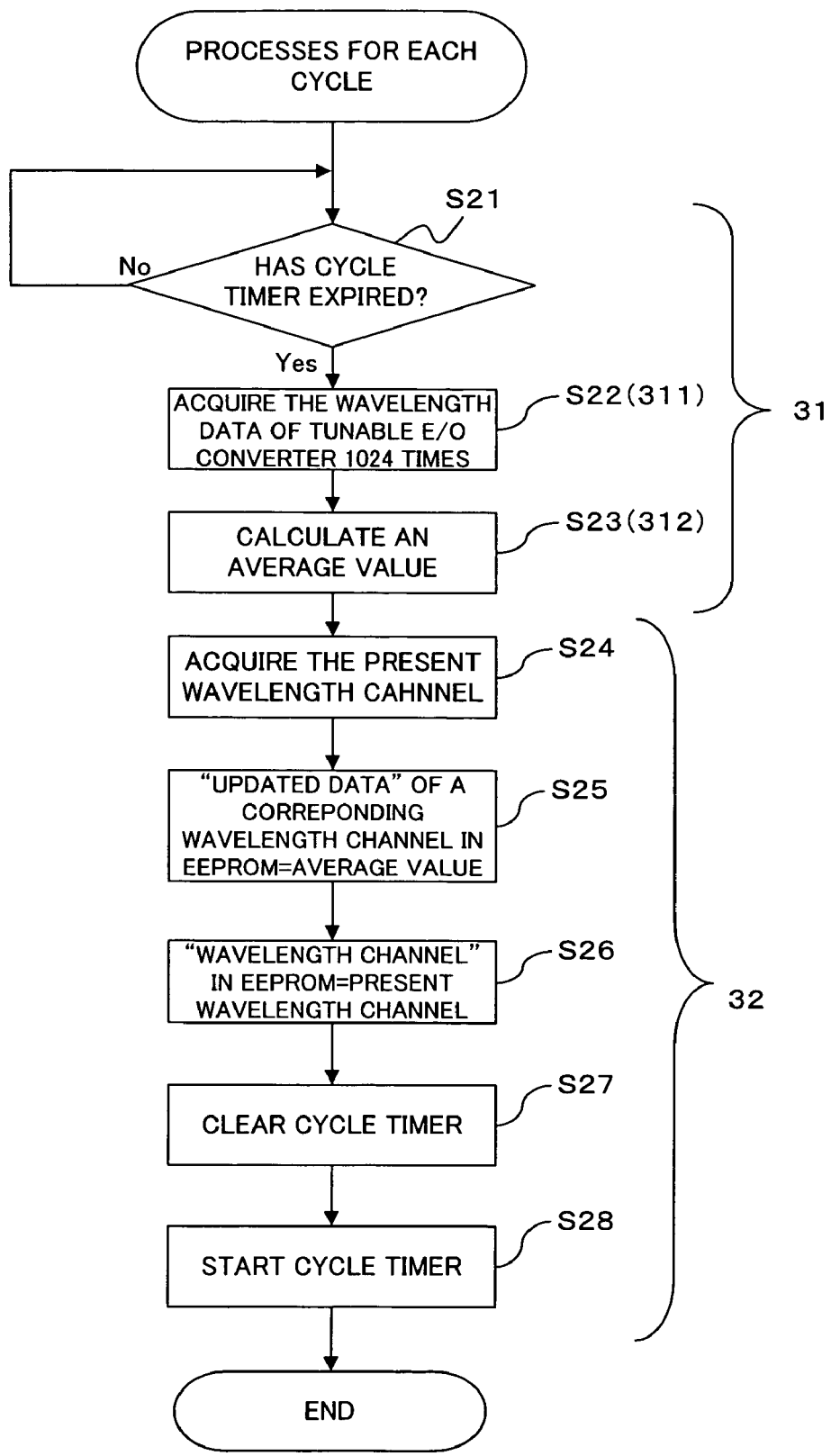
FIG. 7 is a flowchart used to explain the operation (processes for each cycle) of the transponder unit shown in FIGS. 1 and 2.

More specifically, as shown in FIG. 7, the unit processor 3 monitors whether the cycle timer has expired ("No" route in step S21). If it has expired (if the judgment in step S21 is "Yes"), the unit processor 3 acquires (or samples) the wavelength data of the tunable E/O converter 6 from the data setting register 11 or data updating register 12 a predetermined number of times (e.g., 1024 times) (step S22) and calculates an average value of the acquired data (step S23).

That is, the unit processor 3 has a function as a wavelength data sampler 31 that samples wavelength data when the tunable E/O converter 6 is operating at any one of different wavelengths. The wavelength data sampler 31 has a function as a cyclic sampler 311, which cyclically samples the wavelength data of the tunable E/O converter 6 and also acquires that wavelength data a plurality of times in one cycle. The wavelength data sampler 31 also has a function as a wavelength data average calculator 312 that calculates an average value of the wavelength data obtained a plurality of times in one cycle by the cyclic sampler 311.

And the unit processor 3 acquires the present "wavelength channel information" set by provisioning, from the I/O memory 4 (step S24), then writes the above-described average value to the EEPROM 5 as "updated data" corresponding to the "wavelength channel information" (step S25), and writes the present "wavelength channel information" set by provisioning, to the EEPROM 5 as "wavelength channel information" (step S26). That is, the unit processor 3 has a function as a wavelength data updater 32 that updates wavelength data stored in the EEPROM 5 by wavelength data (average value) sampled by the wavelength data sampler 31.

Thereafter, the unit processor 3 clears the cycle time (step S27) and then restarts the cycle timer for the processes 6 to 8 in the next cycle (step S28) and finishes the sequence of steps.

Thereafter, if the transponder unit 2 is shut down, and a shutdown release request is again issued by the entire-unit controller 1, the processes 2 to 4 in FIG. 4 (steps S11 to S17 in FIG. 6) are carried out by the unit processor 3 and wavelength data is set to the tunable E/O converter 6. That is, by executing these processes, the unit processor 3 fulfills a function as a wavelength setting section 33 (see FIG. 6) that sets the wavelength data in the EEPROM 5 updated by the wavelength data updater 32 to the tunable E/O converter 6, when the same operating wavelength needs to be reset to the tunable E/O converter 6.

As described above, in the case where the wavelength data of the same wavelength channel is reset to the tunable E/O converter 6 because of an external cause such as insertion or removable of the transponder unit 2, a power failure, etc., the transponder unit 2 of the preferred embodiment can avoid a shift in wavelength due to the age degradation of the tunable E/O converter 6 by setting to the tunable E/O converter 6 the "updated data" stored in the EEPROM 5 which is cyclically sampled and updated during normal operation.

[B] Description of a First Modification

Figure 8:
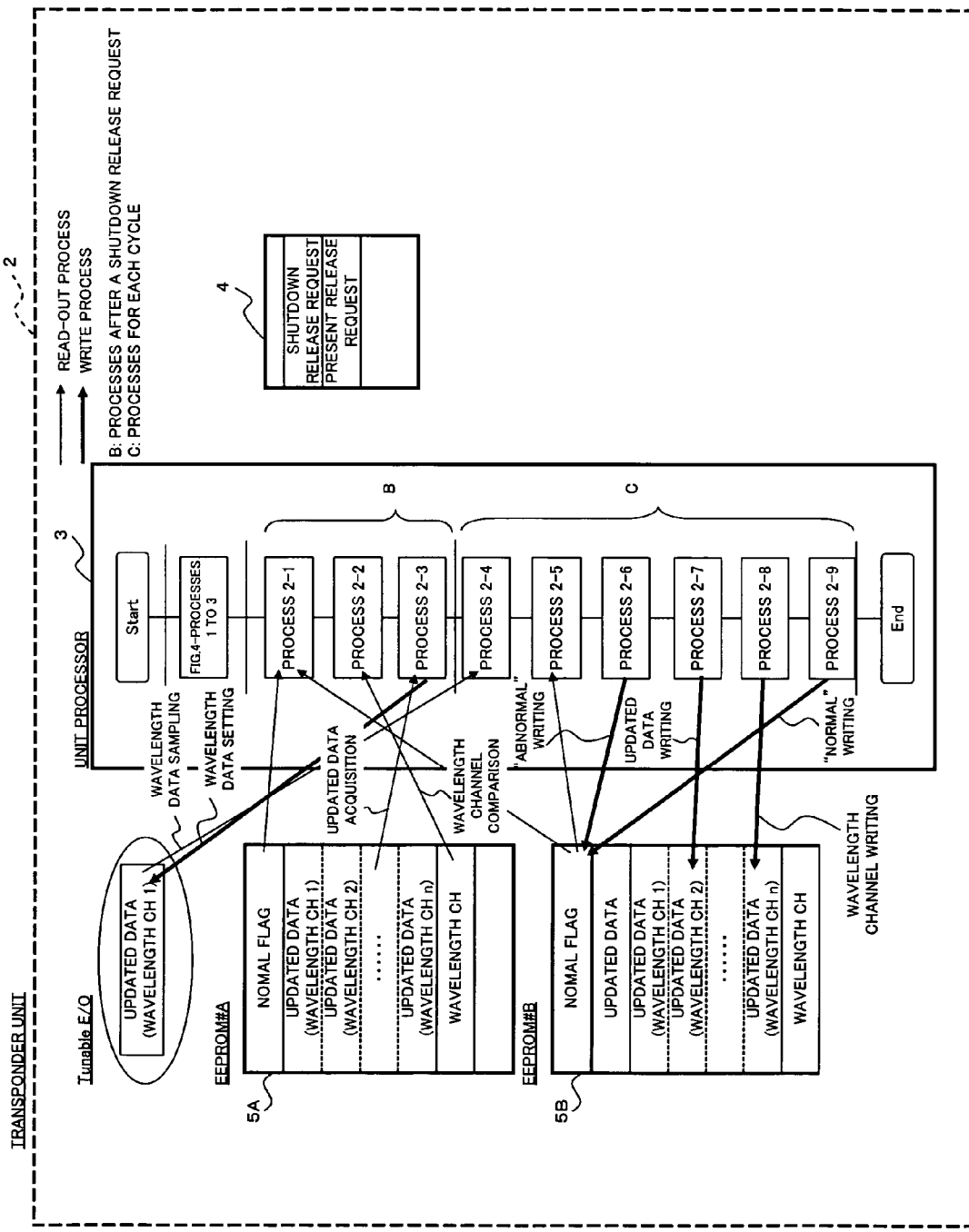
FIG. 8 is a block diagram showing a transponder unit constructed in accordance with a first modification of the preferred embodiment shown in FIG. 4.

Referring to FIG. 8, there is shown a transponder unit 2 constructed in accordance with a first modification of the preferred embodiment shown in FIG. 4. The transponder unit 2 shown in FIG. 8 differs from the construction of FIG. 4 in that it is provided with two EEPROMs 5A and 5B. Unless otherwise noted, the same reference numerals denote the same parts as FIG. 4 or corresponding parts.

As with the aforementioned EEPROM 5, the EEPROMs 5A and 5B store the "updated data" of wavelength data for each wavelength channel and also store "normal flag" information in addition to "wavelength channel information." The "normal flag" information indicates whether the wavelength data (updated data) stored in the EEPROM 5A or 5B is normal or abnormal. In the first modification, by providing two EEPROMs, correct "updated data" can be stored even when insertion or removal of the transponder unit 2 or a power failure occurs during the writing of "updated data."

Operation of the transponder unit 2 of the first modification will hereinafter be described with reference to FIGS. 8 to 11.

Figure 9:
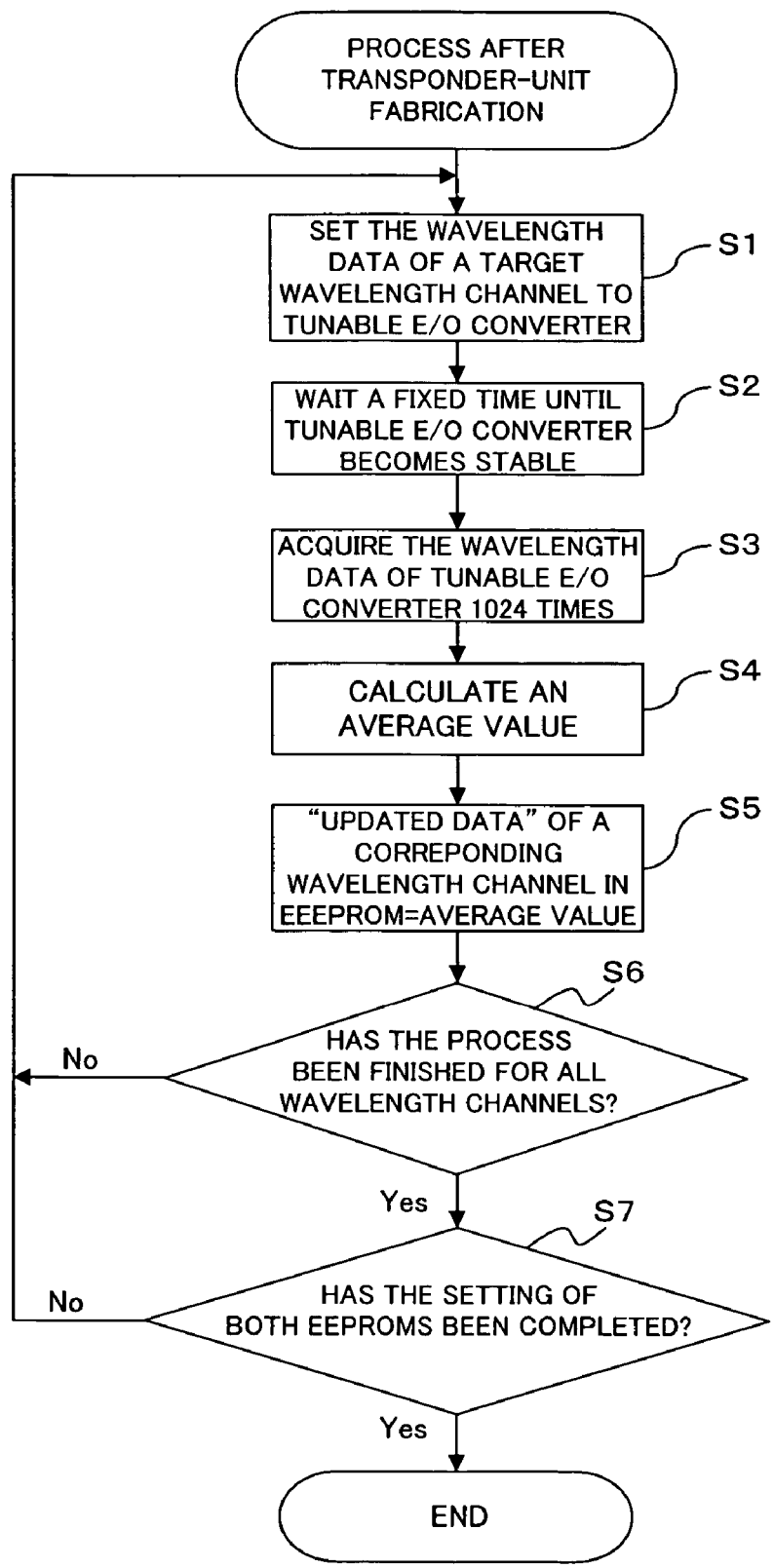
FIG. 9 is a flowchart used to explain the operation (processes after transponder-unit fabrication) of the transponder unit shown in FIG. 8.

The unit processor 3 executes the processes 1 to 3 of FIG. 4 as the processes after fabrication of the transponder unit 2. That is, as shown in FIG. 9, the unit processor 3 stores the "updated data" (average value) of wavelength data in both the EEPROMs 5A and 5B for all wavelength channels by performing the same steps as the steps S1 to S6 shown in FIG. 5, and finishes the steps S1 to S6 if the storage of the updated data of wavelength data into the EEPROMs 5A and 5B is completed for all wavelength channels. At this time, "normal" is stored in the EEPROMs 5A and 5B as "normal flag" information.

Thereafter, as the processes B after a shutdown release request, the unit processor 3 determines an operating wavelength channel from the provisioning information (wavelength channel information set from the entire-unit controller 1 to the I/O memory 4), then selects one of the two EEPROMs 5A and 5B where the "normal flag" information is normal (when both are normal, any of the two may be selected) and determines it as an EEPROM from which wavelength data is acquired (process 2-1), then confirms that the operating wavelength channel is the same as the "wavelength channel information" stored in the EEPROM 5A or 5B (that is, there is no change in the operating wavelength channel) (process 2-2), and acquires the "updated data" of the corresponding wavelength channel stored in the EEPROM 5A or 5B and sets the acquired data to the data setting register 11 of the tunable E/O converter 6 as wavelength data (process 2-3).

Figure 10:
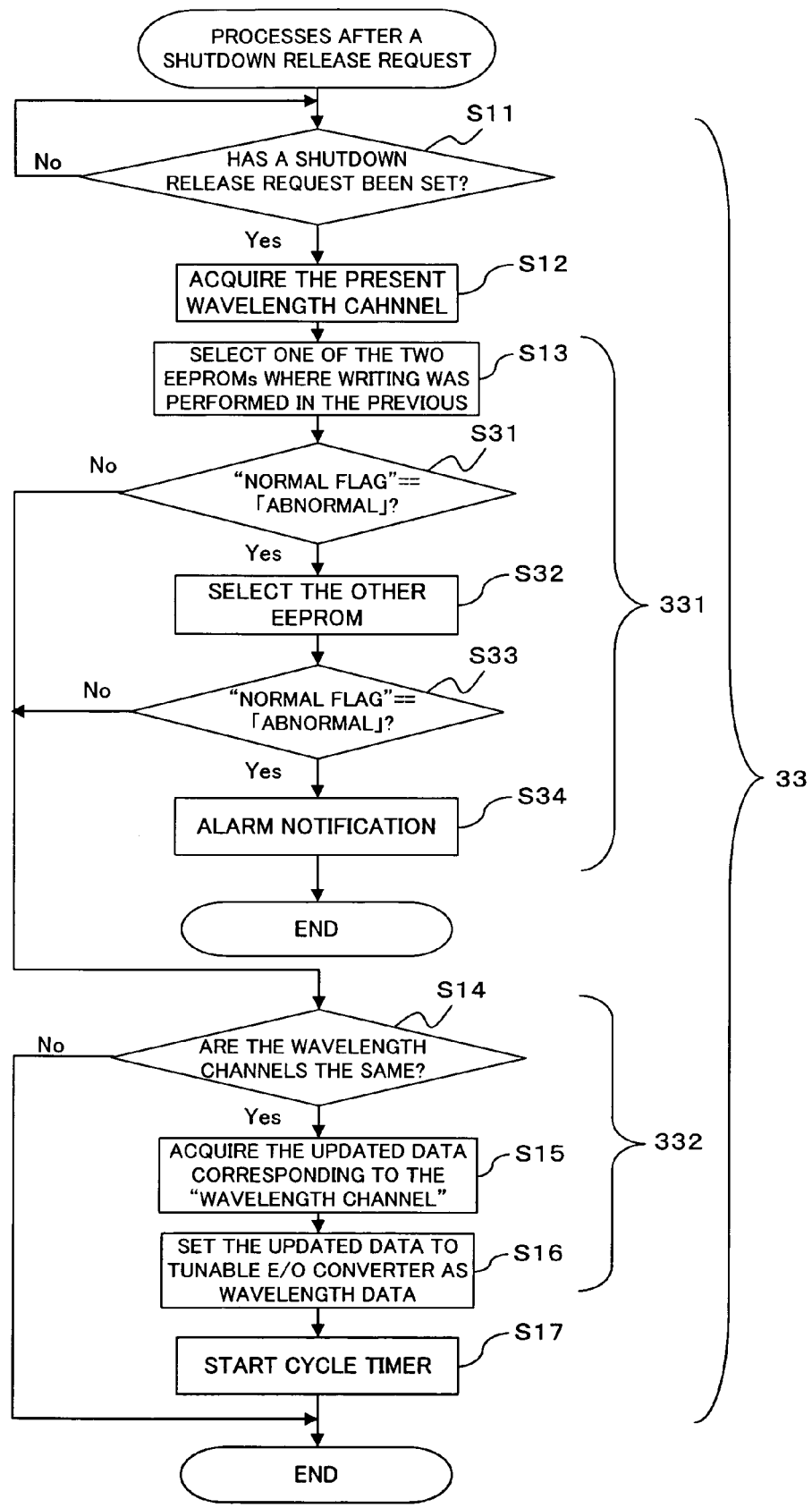
FIG. 10 is a flowchart used to explain the operation (processes after a shutdown release request) of the transponder unit shown in FIG. 8.

That is, as shown in FIG. 10, the unit processor 3 monitors whether a shutdown release request is set from the entire-unit controller 1 to the I/O memory 4 ("No" route in step S11), as with FIG. 6. If it is set to the I/O memory 4 (if the judgment in step S11 is "Yes"), the unit processor 3 acquires the present "wavelength channel information," set by provisioning, from the I/O memory 4 (step S12) and selects the EEPROM 5A or 5B to which data was written in the previous cycle (step S13).

And the unit processor 3 checks whether the "normal flag" in the selected EEPROM 5A or 5B is "abnormal" (step S31). If it is "abnormal" (if the judgment in step S31 is "Yes"), the unit processor 3 selects the other EEPROM 5A or 5B (step S32). Similarly, the unit processor 3 checks whether the "normal flag" in the selected EEPROM 5A or 5B is "abnormal" (step S33). As a result, if it is "abnormal" (if the judgment in step S33 is "Yes"), the "updated data" in the EEPROMs 5A and 5B are abnormal because of the operating lifetimes of the EEPROMs 5A and 5B, etc., and can not be used. Therefore, the unit processor 3 issues an alarm notification to the entire-unit controller 1 through the I/O memory 4 (step S34) and finishes the sequence of steps.

On the other hand, if the "normal flag" in either of the EEPROMs 5A and 5B is "normal" (if the judgment in step S31 or S33 is "No"), the unit processor 3 checks whether the "wavelength channel information" in the EEPROM 5A or 5B is the same as the present "wavelength channel information" acquired from the I/O memory 4 (step S14), as with FIG. 6. If they are the same (if the judgment in step S14 is "Yes"), that is, if there is no change in the operating wavelength channel, the unit processor 3 acquires the "updated data" corresponding to the "wavelength channel information" from the selected EEPROM 5A or 5B (step S15), then sets the acquired data to the data setting register 11 of the tunable E/O converter 6 as wavelength data (step S16), then starts a cycle timer (step S17), and finishes the sequence of steps. Note that if there is a change in the operating wavelength channel (if the judgment in step S14 is "No"), the unit processor 3 finishes the sequence of steps immediately.

That is, the unit processor 3 of the first modification executes the aforementioned steps S11 to S13, S31 to S34, and S14 to S17 shown in FIG. 10 and thereby fulfills a function as the above-described wavelength setting section 33. The unit processor 3 also executes the aforementioned steps S13 and S31 to S34 and thereby fulfills a function as a memory selector 331 which, when the operating wavelength of the tunable E/O converter 6 is reset, checks the normal flag information of each of the EEPROMs 5A and 5B and selects one of the EEPROMs 5A and 5B where writing is normally completed. The unit processor 3 further executes the aforementioned steps S14 to S16 and thereby fulfills a function as a read-out controller 332 that reads out wavelength data from the EEPROM 5A or 5B selected by the memory selector 331 and sets it to the tunable E/O converter 6.

Thereafter, the unit processor 3 performs the processes C for each cycle at the time of normal operation, as shown in FIG. 8. That is, the unit processor 3 samples the present wavelength data of the tunable E/O converter 6 for each cycle of the above-described cycle timer and calculates an average value of the sampled data (process 2-4), then confirms that the "normal flag" in the EEPROM 5A or 5B which was not used in the previous cycle is "normal" (process 2-5), then writes "abnormal" to the "normal flag" of the EEPROM 5A or 5B (process 2-6), and writes the calculated average value to the EEPROM 5A or 5B as the "updated data" of the wavelength channel (process 2-7). The unit processor 3 also writes the present wavelength channel information to the EEPROM 5A or 5B as "wavelength channel information" (process 2-8). Finally, the unit processor 3 writes "normal" to the "normal flag" of the EEPROM 5A or 5B (process 2-9) and finishes the sequence of processes.

Figure 11:
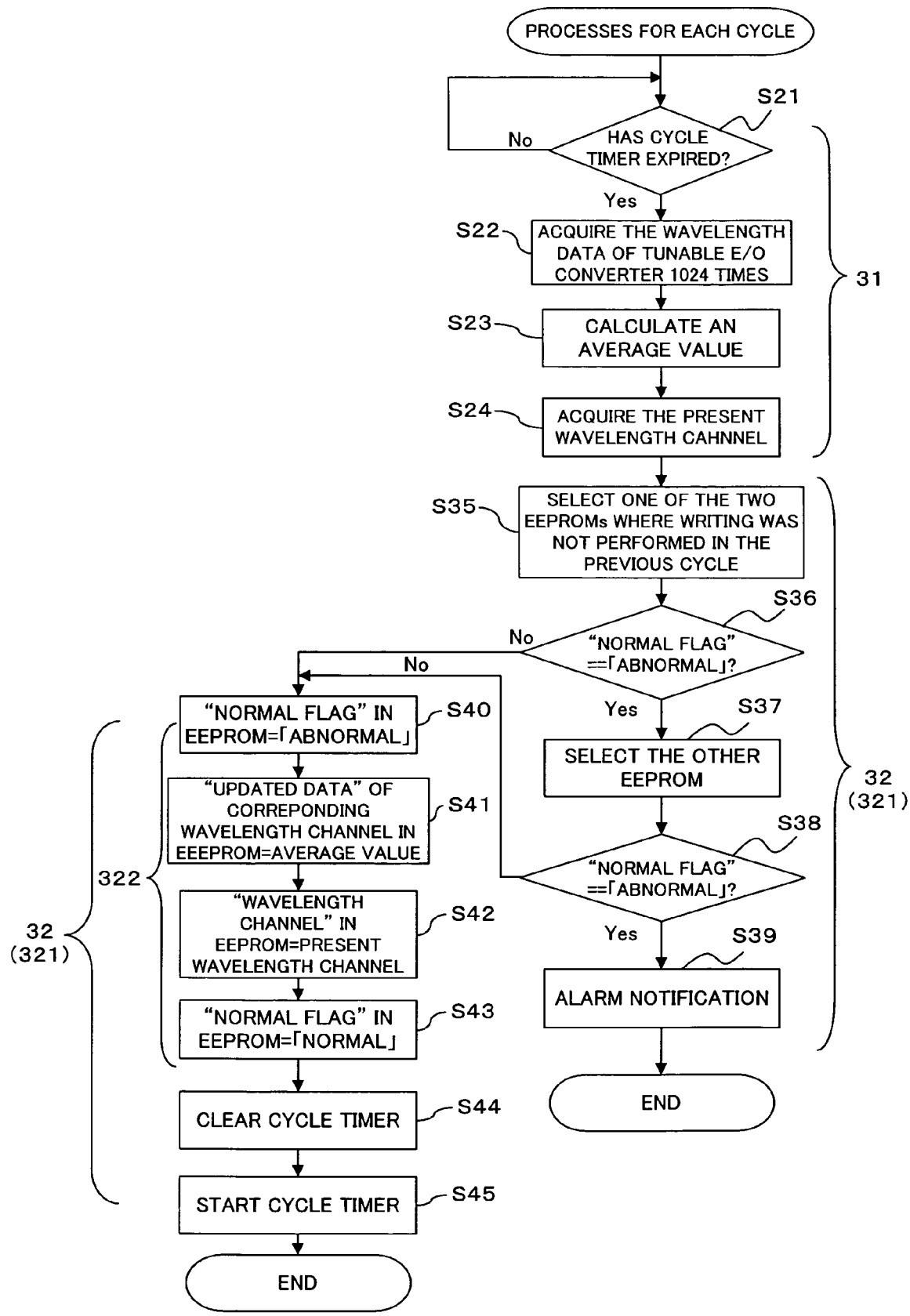
FIG. 11 is a flowchart used to explain the operation (processes for each cycle) of the transponder unit shown in FIG. 8.

That is, as shown in FIG. 11, the unit processor 3 monitors whether the cycle time has expired, as with FIG. 7. If it has expired (if the judgment in step S21 is "Yes"), the unit processor 3 acquires the present wavelength data of the tunable E/O converter 6 a predetermined number of times (e.g., 1024 times) (step S22) and calculates an average value of the acquired data (step S23).

And the unit processor 3 acquires the present "wavelength channel information" from the I/O memory 4 (step S24), then selects the EEPROM 5A or 5B where writing was not performed in the previous cycle (step S35), and checks whether the "normal flag" in the selected EEPROM 5A or 5B is "abnormal" (step S36). As a result, if it is "abnormal" (if the judgment in step S36 is "Yes"), the unit processor 3 selects the other EEPROM 5A or 5B (step S37) and similarly checks whether the "normal flag" in the selected EEPROM 5A or 5B is "abnormal" (step S38).

As a result, if it is "abnormal" (if the judgment in step S38 is "Yes"), the unit processor 3 judges that the "updated data" in both the EEPROMs 5A and 5B are abnormal because of the operating lifetimes of the EEPROMs 5A and 5B, etc., and cannot be used, then issues an alarm notification to the entire-unit controller 1 through the I/O memory 4 (step S39), and finishes the sequence of steps.

On the other hand, the "normal flag" in either EEPROM 5A or 5B is "normal" (if the judgment in step S36 or S38 is "No"), the unit processor 3 rewrites the "normal flag" of the EEPROM 5A or 5B from "normal" to "abnormal" (step S40), then writes the average value calculated in step S47 to the EEPROM 5A or 5B as the "updated data" of the wavelength channel (step S41), then writes the present "wavelength channel information" acquired from the I/O memory 4 as "wavelength channel information" (step S42), and rewrites the "normal flag" of the EEPROM 5A or 5B from "abnormal" to "normal" (step S43).

That is, when insertion or removal of the transponder unit 2 or a power failure occurs during the writing of data to the EEPROMs 5A and 5B, the "normal flag" remains "abnormal." In that case, the unit processor 3 is able to select either EEPROM 5A or 5B where the "normal flag" is "normal," by performing the above-described sequence of steps.

Thereafter, the unit processor 3 clears the cycle timer (step S44), restarts the cycle timer for the updating of wavelength data in the next normal operation (step S45), and finishes the sequence of steps.

That is, the unit processor 3 of the first modification executes the aforementioned steps S21 to S24 shown in FIG. 11 and thereby fulfills a function as the above-described wavelength data sampler 31. The unit processor 3 also executes the aforementioned steps S35 to S43 shown in FIG. 11 and thereby fulfills a function as the wavelength data updater 32 and also fulfills a function as a write controller 321 that writes the wavelength data sampled by the wavelength data sampler 31 to the EEPROMs 5A and 5B or to one of the EEPROMs 5A and 5B where the wavelength data sampled in the previous cycle was not stored, and also writes normal flag information, which indicates that writing is normally or abnormally completed, to the EEPROMs 5A and 5B or the aforementioned one EEPROM 5A or 5B.

In addition, the unit processor 3 executes the aforementioned steps S40 to S43 shown in FIG. 11 and thereby fulfills a function the write controller 321 and also fulfills a function a flag information updater 322 that writes abnormal completion information to each of the EEPROMs 5A and 5B as the normal flag information during the time the wavelength data is being written to the EEPROMs 5A and 5B, and rewrites the normal flag information from the abnormal completion information to normal completion information if the writing is normally completed.

If insertion or removal of the transponder 2 or a power failure occurs during the writing of data to the EEPROMs 5A and 5B, there is a possibility that the data in the EEPROMs 5A and 5B will be damaged. In that case, the "normal flag" in each of the EEPROMs 5A and 5B remains "abnormal" by the above-described process 2-6 (steps S40 to S43). Therefore, when wavelength data is reset to the tunable E/O converter 6 after remounting of the transponder unit 2 or power recovery, the EEPROMs 5A and 5B where correct data is stored can be recognized by the above-described process 2-1 (steps S31 to S34 in FIG. 10). Therefore, even when the writing of data to the EEPROMs 5A and 5B is shut down because of an external cause such as insertion or removal of the transponder unit 2, a power failure, etc., it is possible to set wavelength data to the tunable E/O converter 6 in consideration of age degradation.

[C] Description of a Second Modification

Figure 12:
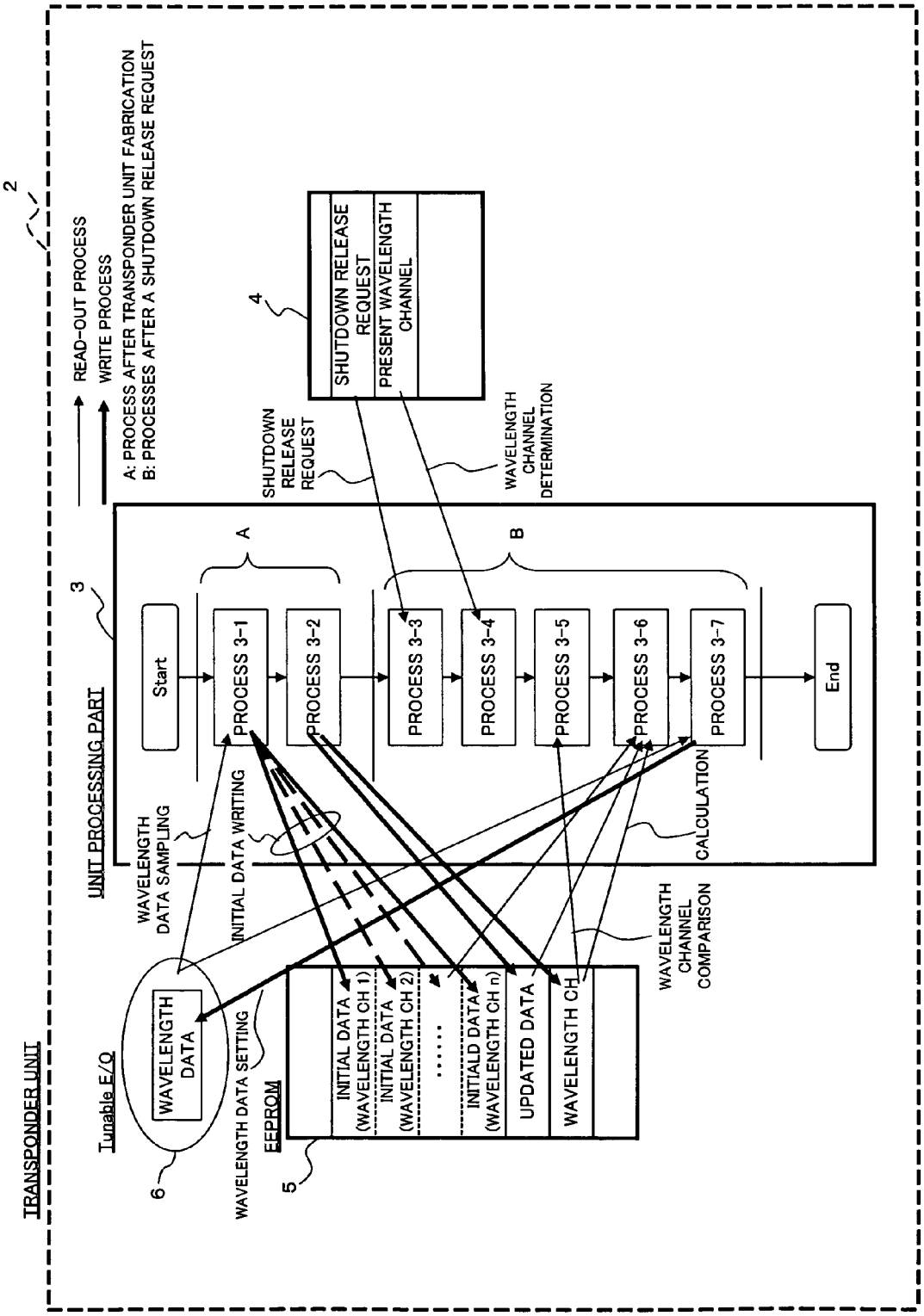
FIG. 12 is a block diagram showing a transponder unit constructed in accordance with a second modification of the preferred embodiment shown in FIG. 4.

Referring to FIG. 12, there is shown a transponder unit 2 constructed in accordance with a second modification of the preferred embodiment shown in FIG. 4. The transponder unit 2 shown in FIG. 12 is the same in hardware as the construction of FIG. 4, but it differs from that of FIG. 4 in that processes 3-1 and 3-2 are executed as the processes A after fabrication of the transponder unit 2 and processes 3-3 to 3-7 are executed as the processes B after a shutdown release request. Unless otherwise noted, the same reference numerals denote the same parts as FIG. 4 or corresponding parts.

Operation of the transponder unit 2 of the second modification will hereinafter be described with reference to FIGS. 12 to 14.

As shown in FIG. 12, the unit processor 3 samples the wavelength data of the tunable E/O converter 6 for each wavelength channel after transponder-unit fabrication and writes it as the "initial data" of each wavelength channel stored in the EEPROM 5 (process 3-1), and selects a suitable wavelength channel and sets the selected wavelength channel and the sampled wavelength data as the "wavelength channel information" and "updated data" of the EEPROM 5 (process 3-2).

Figure 13:
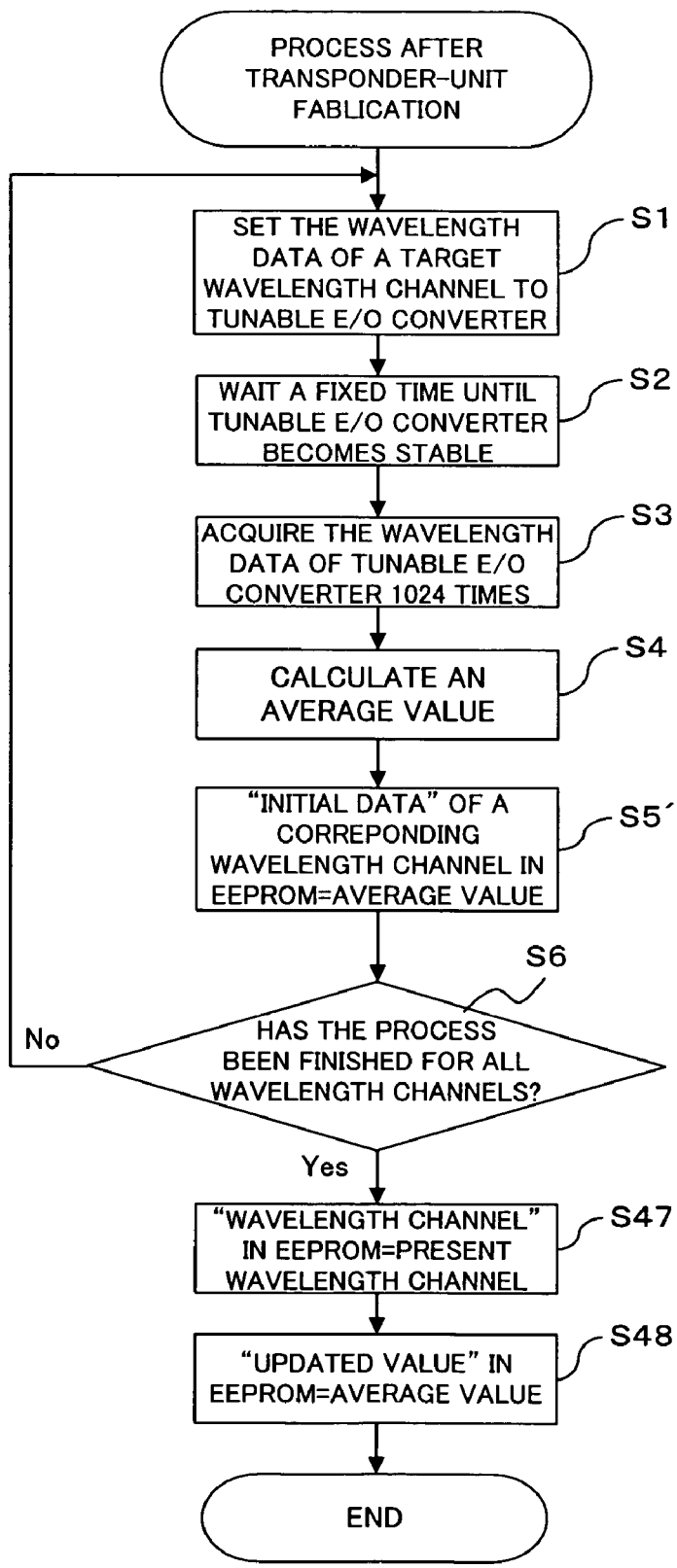
FIG. 13 is a flowchart used to explain the operation (processes after transponder-unit fabrication) of the transponder unit shown in FIG. 12.

That is, as shown in FIG. 13, the unit processor 3, as with FIG. 5, sets the wavelength data of a target wavelength channel to the tunable E/O converter 6 (step S1) and waits a fixed time until the output wavelength of the tunable E/O converter 6 becomes stable (step S2). Thereafter, the unit processor 3 samples the wavelength data of the tunable E/O converter 6 a predetermined number of times (e.g., 1024 times) (step S3), then calculates an average value of the sampled data (step S4), and sets the calculated average value to the "initial data" of that wavelength channel of the EEPROM 5 (step S5').

And the unit processor 3 repeats the sequence of steps for all wavelength channels (until the judgment in step S6 becomes "Yes") and acquires "initial data" (average value) of each of all wavelength channels and stores it in the EEPROM 5 ("No" route in step S6). If the "initial data" for all wavelength channels are stored in the EEPROM 5 (if the judgment in step S6 is "Yes"), the unit processor 3 selects a suitable wavelength channel, then sets the selected wavelength channel and the sampled wavelength data as the "wavelength channel information" and "updated data" of the EEPROM 5 (steps S47 and S48), and finishes the sequence of steps.

Table 2 lists examples of the "initial data" in the case of using the tunable E/O converter 6 for the first time. In Table 2, selectable wavelength channels are four channels, λ1 to λ4. An applied voltage 10 V relative to the LD 61 is calculated as FFFF, and 0 V is calculated as 0000.

TABLE 2

Initial data for λ1 to λ4 (fixed values)

| Channel No. | Initial data (HEX) | Equivalent voltage (V) |
|---|---|---|
| λ1(1531.90 nm) | 0x400 | 2.000 |
| λ2(1532.68 nm) | 0x2F8 | 1.481 |
| λ3(1533.47 nm) | 0x1A6 | 0.823 |
| λ4(1534.25 nm) | 0x000 | 0.000 |

After normal operation, if a shutdown release request is set from the entire-unit controller 1 to the I/O memory 4, the unit processor 3 knows that wavelength data needs to be set to the tunable E/O converter 6 (process 3-3), as shown in FIG. 12. The unit processor 3 also determines an operating wavelength channel from the provisioning information (the present wavelength channel information set to the I/O memory 4) (process 3-4). And the unit processor 3 compares the operating wavelength channel with a wavelength channel specified by the "wavelength channel information" stored in the EEPROM 5 (process 3-5). If they differ from each other, the unit processor 3 calculates wavelength data that is to be set to the tunable E/O converter 6 by the following Eq. (1), from the "updated data," "wavelength channel information," "initial data" corresponding to the "wavelength channel information," and "initial data" corresponding to the present "wavelength channel information" acquired from the I/O memory 4, stored in the EEPROM 5 in the previous cycle, and from a previously set "wavelength-switching coefficient" (process 3-6); and sets the calculated wavelength data to the data setting register 11 of the tunable E/O converter 6 (process 3-7).

("updated data"−"initial data" corresponding to "wavelength channel information")×wavelength-switching coefficient+present "wavelength channel information" (1)

Figure 14:
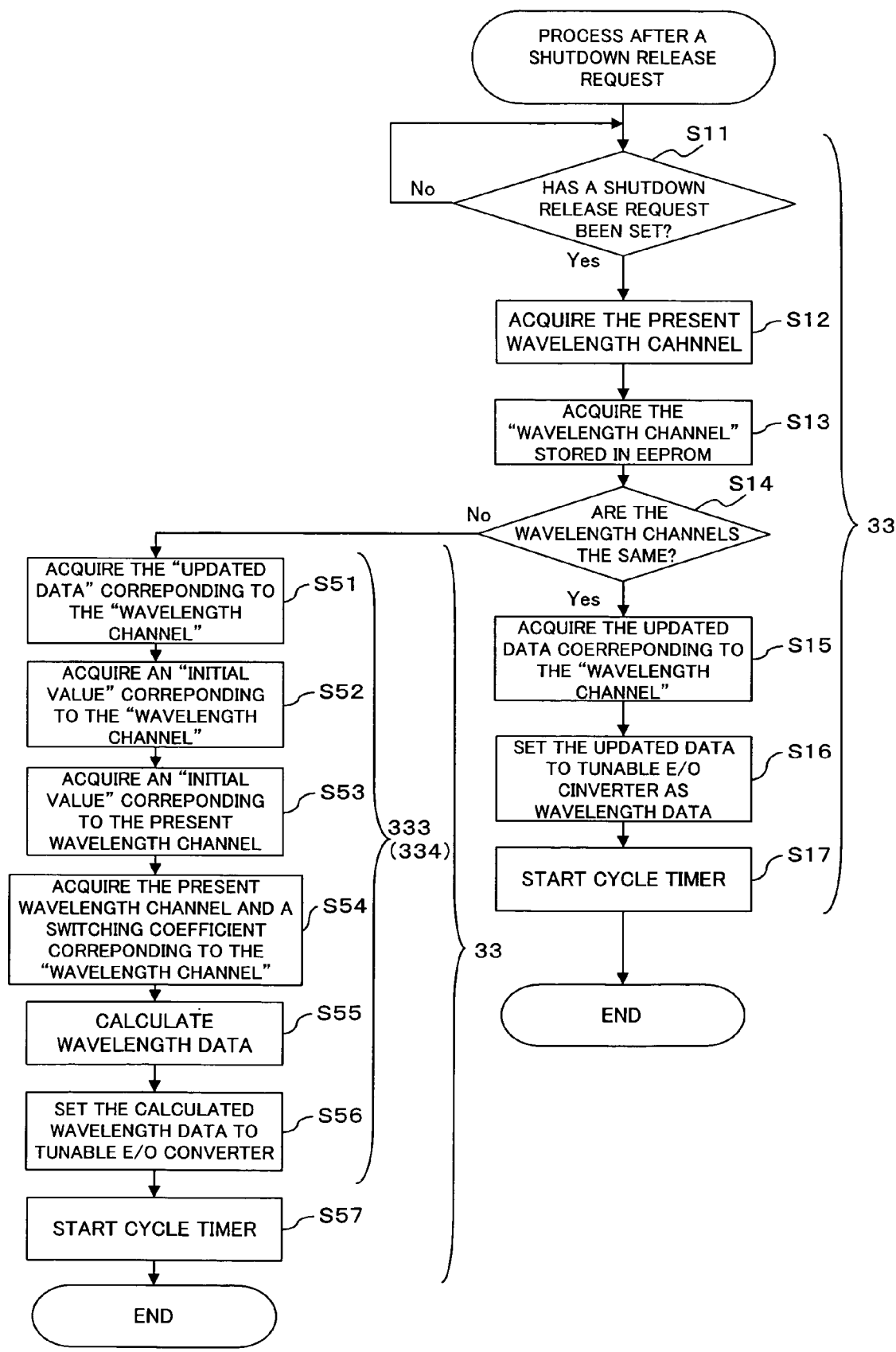
FIG. 14 is a flowchart used to explain the operation (processes after a shutdown release request) of the transponder unit shown in FIG. 12.

More specifically, as shown in FIG. 14, the unit processor 3 monitors whether a shutdown release request is set to the I/O memory 4 ("No" route in step S11), as with FIG. 6. If it is set to the I/O memory 4 (if the judgment in step S11 is "Yes"), the unit processor 3 acquires the present "wavelength channel information" from the I/O memory 4 (step S12), also acquires "wavelength channel information" from the EEPROM 5 (step S13), and checks whether they are the same (step S14).

If they are the same (if the judgment in step S14 is "Yes"), the unit processor 3 acquires "updated data" corresponding to the "wavelength channel information" from the EEPROM 5 (step S15), then sets the "updated data" to the data setting register 11 of the tunable E/O converter 6 as wavelength data (step S16), then starts the cycle timer (step S17), and finishes the sequence of steps.

On the other hand, if they are not the same, that is, if there is a change in the operating wavelength channel (if the judgment in step S14 is "No"), the unit processor 3 acquires the "updated data," "wavelength channel information," "initial data" corresponding to the "wavelength channel information," and "initial data" corresponding to the present "wavelength channel information" acquired from the I/O memory 4, stored in the EEPROM 5 in the previous cycle, from the EEPROM 5 (steps S51 to S53), and also acquires a "switching coefficient" that corresponds to the "wavelength channel information" acquired from the EEPROM 5 and to the present "wavelength channel information" acquired from the I/O memory 4 (step S54).

And the unit processor 3 calculates wavelength data by the aforementioned Eq. (1) (step S55), then sets the calculated wavelength data to the data setting register 11 of the tunable E/O converter 6 (step S56), then starts the cycle timer (step S57), and finishes the sequence of steps.

That is, the unit processor 3 executes the aforementioned steps S11 to S17 and S51 to S57 shown in FIG. 14 and thereby functions as the above-described wavelength setting section 33. The unit processor 3 also executes the aforementioned steps S51 to S56 shown in FIG. 14 and thereby functions as a switched wavelength data calculator 333 which, when the operating wavelength of the tunable E/O converter 6 is switched to a different wavelength, calculates wavelength data to be set as that different wavelength in dependence on the wavelength data stored in the EEPROM 5, and as a switched wavelength setting section 334 which sets the wavelength data calculated by the switched wavelength data calculator 333 to the tunable E/O converter 6.

Table 3 lists examples of the above-described switching coefficient. Selectable wavelength channels are four channels, $\lambda 1$ to $\lambda 4$, and switching patters are 4×4=16 patterns.

TABLE 3

Wavelength Switching Coefficient

| Channel switching | Coefficient |
| --- | --- |
| $\lambda 1 \rightarrow \lambda 1$ | 1.000 |
| $\lambda 1 \rightarrow \lambda 2$ | 1.300 |
| $\lambda 1 \rightarrow \lambda 3$ | 1.660 |
| $\lambda 1 \rightarrow \lambda 4$ | 2.040 |
| $\lambda 2 \rightarrow \lambda 1$ | 0.769 |
| $\lambda 2 \rightarrow \lambda 2$ | 1.000 |
| $\lambda 2 \rightarrow \lambda 3$ | 1.277 |
| $\lambda 2 \rightarrow \lambda 4$ | 1.569 |
| $\lambda 3 \rightarrow \lambda 1$ | 0.602 |
| $\lambda 3 \rightarrow \lambda 2$ | 0.783 |
| $\lambda 3 \rightarrow \lambda 3$ | 1.000 |
| $\lambda 3 \rightarrow \lambda 4$ | 1.229 |
| $\lambda 4 \rightarrow \lambda 1$ | 0.490 |
| $\lambda 4 \rightarrow \lambda 2$ | 0.637 |
| $\lambda 4 \rightarrow \lambda 3$ | 0.814 |
| $\lambda 4 \rightarrow \lambda 4$ | 1.000 |

Thus, according to the second modification, even when the wavelength channel is changed by a change in the provisioning information, it is possible to set wavelength data to the tunable E/O converter 6 in consideration of age degradation.

Note that the above-described method is also applicable to the aforementioned first modification.

[D] Description of a Third Modification

A third modification of the preferred embodiment shown in FIG. 4 will hereinafter be described with reference to FIG. 15.

In the aforementioned process 6 shown in FIG. 4, the transponder unit 2 samples the present wavelength data of the tunable E/O converter 6 in the cycle of the cycle timer and calculates an average value of the sampled data. Generally, by acquiring wavelength data an arbitrary number of times in an arbitrary cycle and calculating an average value of the acquired data, the influence of errors due to a shift in the wavelength of the tunable E/O converter 6 can be made smaller. However, if the tunable E/O converter 6 is shut down during sampling of wavelength data by a shutdown request sent from the entire-unit controller 1, the wavelength data sampled thereafter will indicate abnormal values. Therefore, if an average value is calculated based on the abnormal values, and in the aforementioned step 7 shown in FIG. 4, the calculated average value is written to the EEPROM 5 as the "updated data" of the corresponding wavelength channel, an erroneous value will be set at the next setting of wavelength data to the tunable E/O converter 6 and therefore a shift in wavelength will occur.

Figure 15:
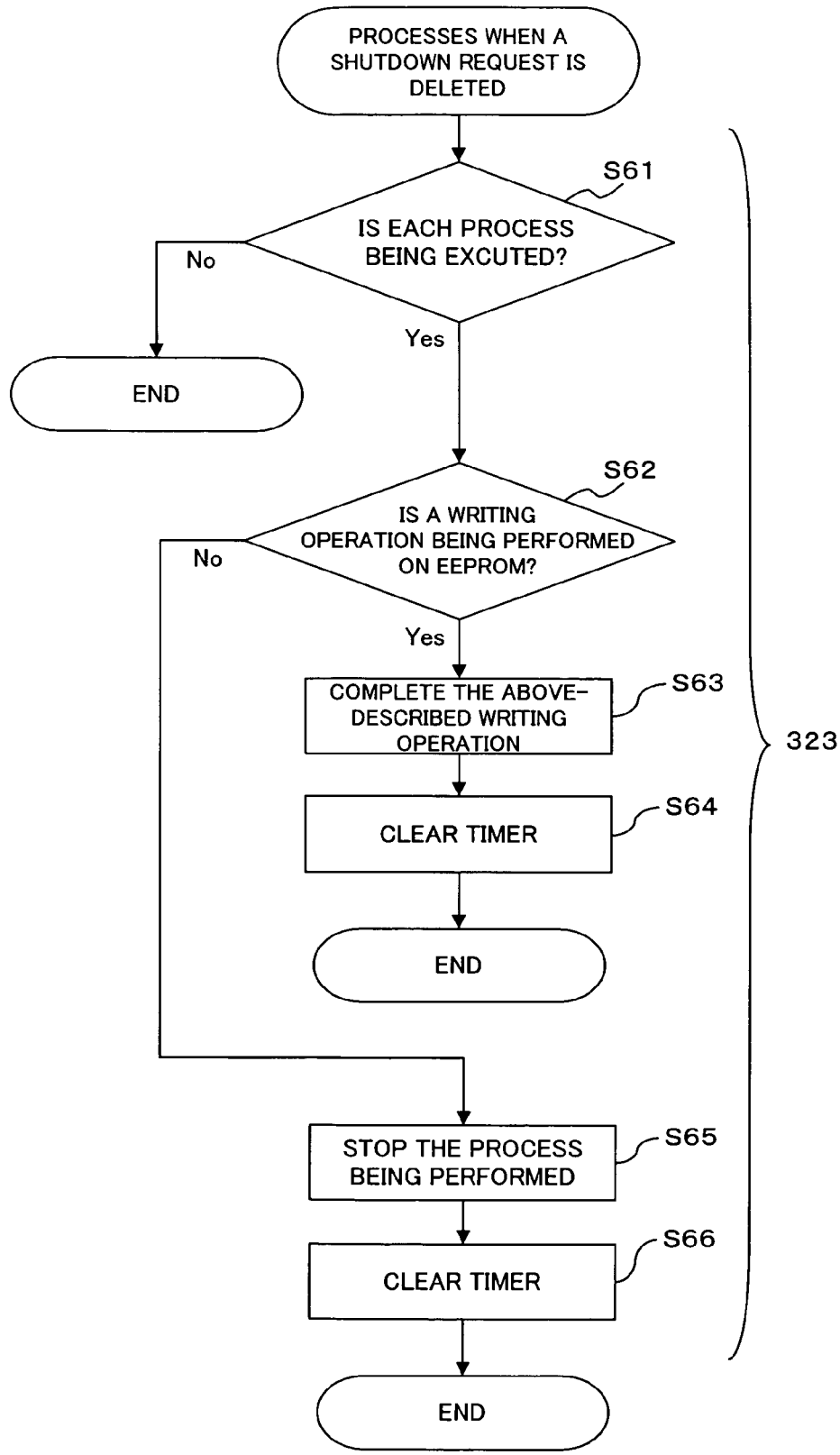
FIG. 15 is a flowchart used to explain the operation of a transponder unit constructed in accordance with a third modification of the preferred embodiment shown in FIG. 4.

Hence, in the case where the wavelength data of the tunable E/O converter 6 is being sampled when a shutdown request from the entire-unit controller 1 is detected, the unit processor 3 stops the sampling step immediately and prevents erroneous values from being stored in the EEPROM 5 as "updated data." That is, the unit processor 3 of the third modification monitors whether the aforementioned processes 1 to 8 shown in FIG. 4 are being executed (step S61), as shown in FIG. 15. If none of the processes are being executed, the unit processor 3 finishes the step S61 ("No" route in step S61). If any one of the processes 1 to 8 is being executed (if the judgment in step S61 is "Yes"), the unit processor 3 checks whether the process is the writing of data to the EEPROM 5 (step S62).

As a result, if data is being written to the EEPROM 5 (if the judgment in step S62 is "Yes"), the unit processor 3 completes the process to the last (step S63), then clears the cycle timer (step S64), and finishes the sequence of steps. On the other hand, if no data is being written to the EEPROM 5 (if the judgment in step S62 is "No"), the unit processor 3 stops a process being performed (step S65), then clears the cycle timer (step S66), and finishes the sequence of steps.

By executing the aforementioned steps, the unit processor 3 can prevent erroneous wavelength data from being set to the EEPROM 5.

That is, the unit processor 3 of the third modification executes the aforementioned steps S61 to S66 and thereby functions as the aforementioned wavelength data updater 32. If the tunable E/O converter 6 is shut down when wavelength data is being sampled by the wavelength data sampler 31, the unit processor 3 functions as an updating-process stopping section 323 that stops an updating process being performed on the EEPROM 5.

[E] Description of a Fourth Modification

Figure 16:
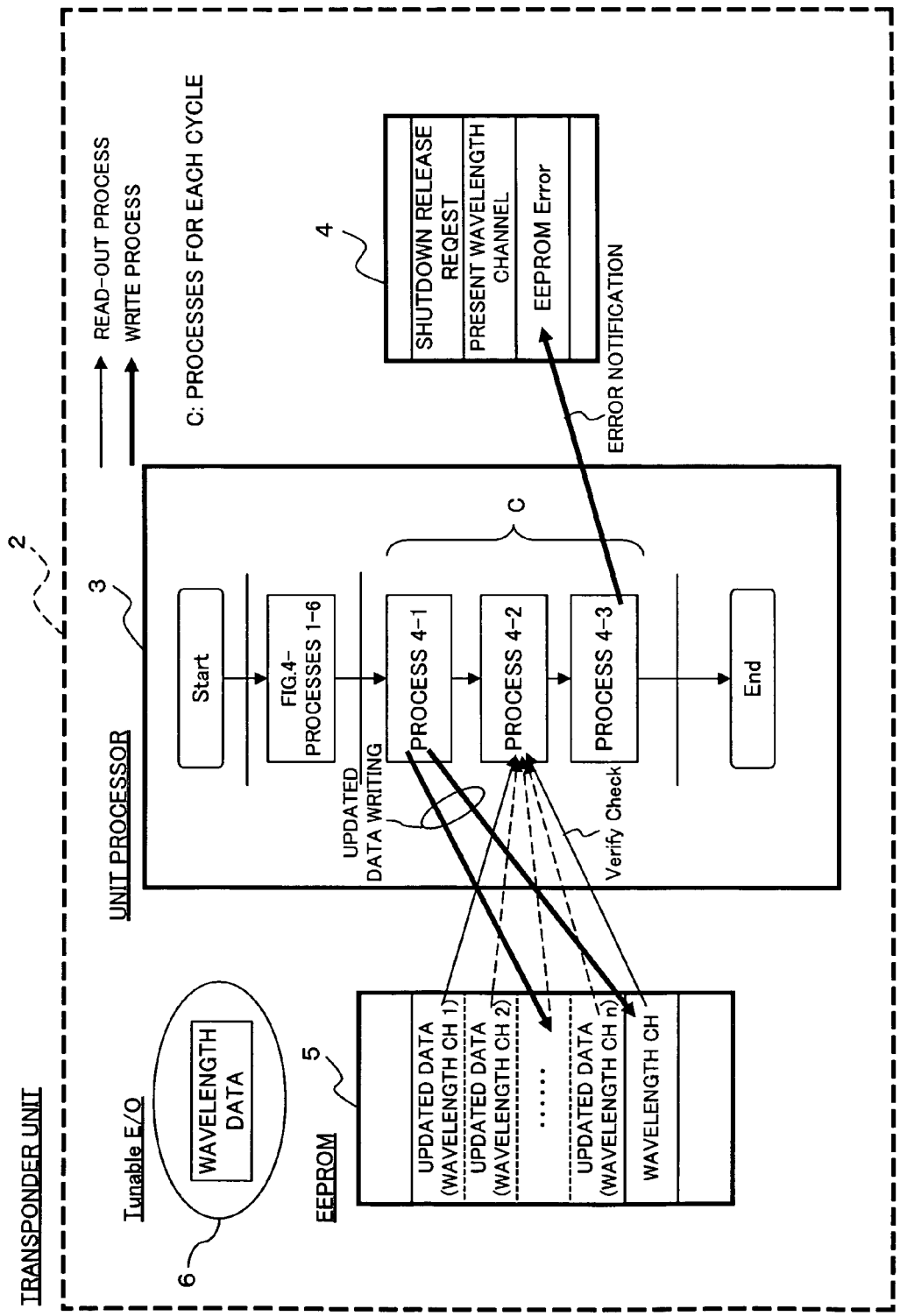
FIG. 16 is a block diagram showing a transponder unit constructed in accordance with a fourth modification of the preferred embodiment shown in FIG. 4.

Referring to FIG. 16, there is shown a transponder unit 2 constructed in accordance with a fourth modification of the preferred embodiment shown in FIG. 4. The transponder unit 2 shown in FIG. 16 is the same in hardware as the construction of FIG. 4, but it differs from that of FIG. 4 in that in addition to the aforementioned processes 1 to 6 shown in FIG. 4, the unit processor 3 executes processes 4-1 to 4-3 as the processes C for each cycle. Unless otherwise noted, the same reference numerals denote the same parts as FIG. 4 or corresponding parts.

Operation of the transponder unit 2 of the fourth modification will hereinafter be described with reference to FIGS. 16 and 17.

In the process 6 described in FIG. 4, the unit processor 3 stores an average value in the EEPROM 5 as the "updated data" of the corresponding wavelength channel, and writes the present "wavelength channel information" acquired from the I/O memory 4, to the EEPROM 5 as "wavelength channel information" (process 4-1). Thereafter, the unit processor 3 performs verification on the EEPROM 5 (process 4-2). If there is an error, the unit processor 3 notifies the entire-unit controller 1 of that error (process 4-3).

Figure 17:
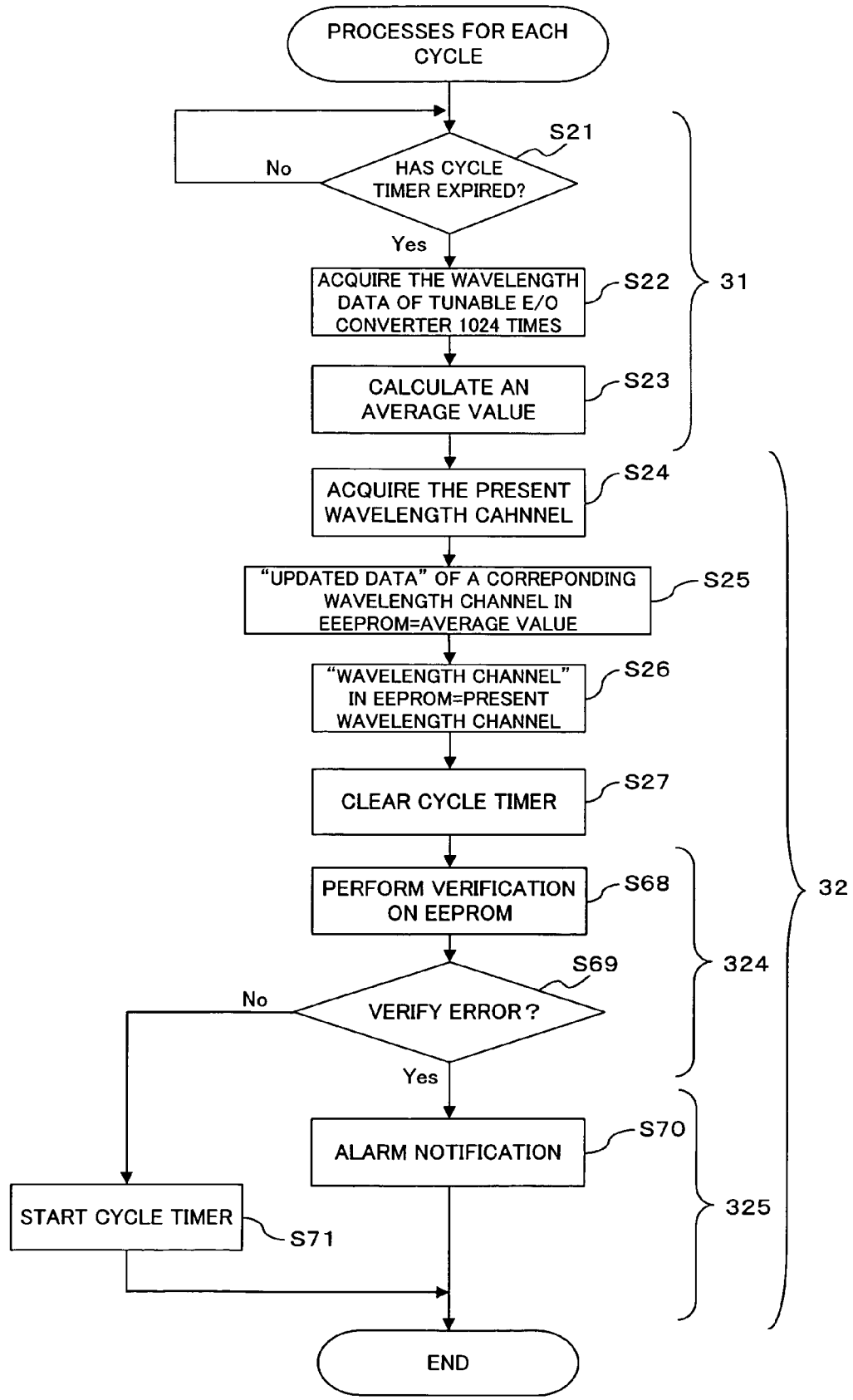
FIG. 17 is a flowchart used to explain the operation (processes for each cycle) of the transponder unit shown in FIG. 16.

More specifically, as shown in FIG. 17, the unit processor 3 monitors whether the cycle timer has expired ("No" route in step S21), as with FIG. 7. If it has expired (if the judgment in step S21 is "Yes"), the unit processor 3 acquires the wavelength data of the tunable E/O converter 6 a predetermined number of times (e.g., 1024 times) (step S22), and calculates an average value of the acquired data (step S23). And the unit processor 3 acquires the present "wavelength channel information" from the I/O memory 4 (step S24), then writes the above-described average value to the EEPROM 5 as "updated data" corresponding to the "wavelength channel information" (step S25), then writes the present "wavelength channel information" to the EEPROM 5 as "wavelength channel information" (step S26), and clears the cycle timer (step S27).

Thereafter, the unit processor 3 reads out various data from the EEPROM 5 to verify whether data can be normally read out (step S68), and verifies whether data can be normally read out (step S69). If it can be normally read out, the unit processor 3 starts the cycle timer (step S71) and finishes the sequence of steps. On the other hand, if it cannot be normally read out, the unit processor 3 notifies the entire-unit controller (supervisory controller) 1 of memory error information by storing the error information in the I/O memory 4 (step S70) and finishes the sequence of steps.

That is, the unit processor 3 of the fourth modification executes the aforementioned steps S21 to S23 shown in FIG. 17 and thereby functions as the above-described wavelength data sampler 31. The unit processor 3 also executes the steps S24 to S27 and steps S68 to S71 shown in FIG. 17 and thereby functions as the above-described wavelength data updater 32. The unit processor 3 further executes steps S68 to S71 and thereby functions as a verification checker 324 which, if an updating process is performed on the EEPROM 5, verifies whether data can be normally read out from the EEPROM 5, and as a normal notification section 325 which, when data cannot be normally read out from the EEPROM 5 by the verification checker 324, outputs to the supervisory controller 1 a notification that the EEPROM 5 is abnormal.

As set forth above, the unit processor 3 cyclically performs verification on the EEPROM 5, whereby the "updated data" of the EEPROM 5 containing errors can be prevented from being set to the tunable E/O converter 6. In addition, by notifying the entire-unit controller 1 of a memory error, it is able to cope with that error quickly.

[F] Description of a Fifth Modification

A fifth modification of the preferred embodiment shown in FIG. 4 will hereinafter be described with reference to FIGS. 18 and 19.

Figure 18:
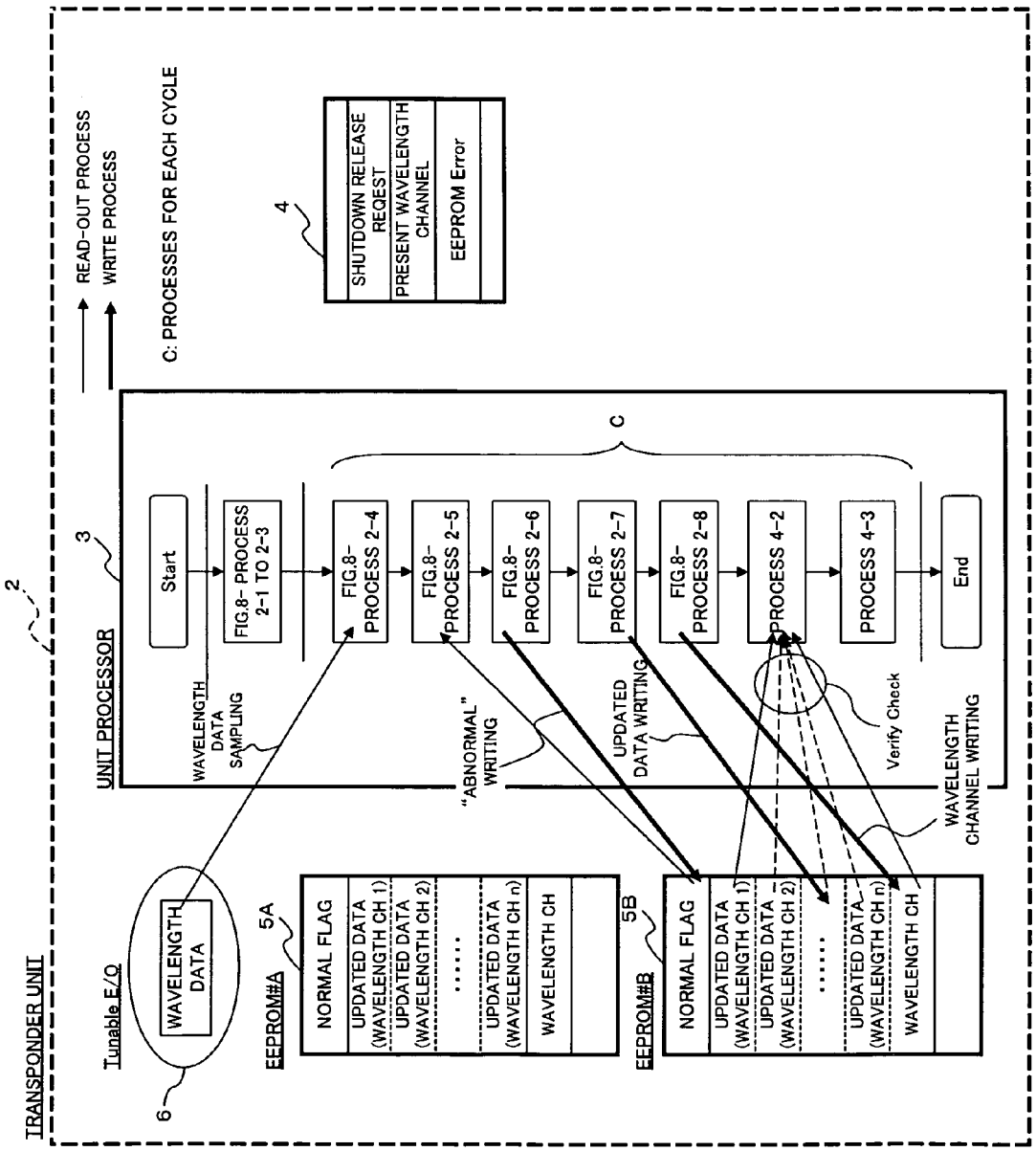
FIG. 18 is a block diagram showing a transponder unit constructed in accordance with a fifth modification of the preferred embodiment shown in FIG. 4.

As described in the second modification, in the case where the transponder unit 2 is provided with two EEPROMs 5A and 5B, the present "wavelength channel information" acquired from the I/O memory 4 is written to either EEPROM 5A or 5B in process 2-8 described in FIG. 8, as shown in FIG. 18. Then, the unit processor 3 performs verification (process 4-2). If a memory error is detected, the unit processor 3 notifies the entire-unit controller 1 of that memory error through the I/O memory 4 (process 4-3) and finishes the sequence of processes.

Figure 19:
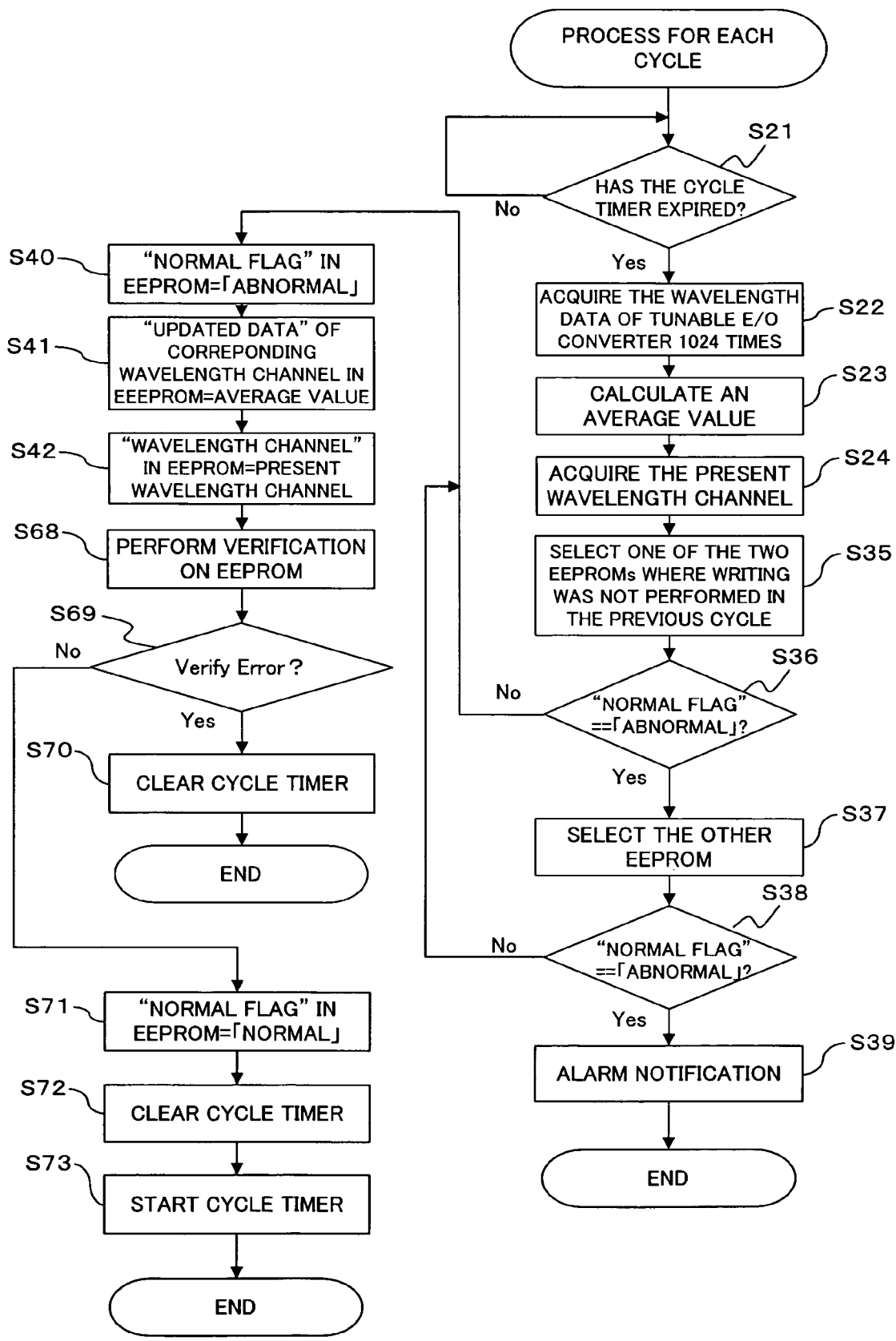
FIG. 19 is a flowchart used to explain the operation (processes for each cycle) of the transponder unit shown in FIG. 18.

More specifically, as shown in FIG. 19, the unit processor 3 monitors whether the cycle timer has expired ("No" route in step S21), as with FIG. 11. If it has expired (if the judgment in step S21 is "Yes"), the unit processor 3 acquires the present wavelength data of the tunable E/O converter 6 a predetermined number of times (e.g., 1024 times) (step S22) and calculates an average value of the acquired data (step S23).

And the unit processor 3 acquires the present "wavelength channel information" from the I/O memory 4 (step S24), then selects the EEPROM 5A or 5B where writing was not performed in the previous cycle (step S35), and checks whether the "normal flag" in the selected EEPROM 5A or 5B is "abnormal" (step S36). If it is abnormal (if the judgment in step S36 is "Yes"), the unit processor 3 selects the other EEPROM 5A or 5B (step S37). Similarly, the unit processor 3 checks whether the "normal flag" in the selected EEPROM 5A or 5B is "abnormal" (step S38).

If it is abnormal, the unit processor 3 judges that the "updated data" stored in both the EEPROMs 5A and 5B are abnormal because of the operating lifetimes of the EEPROMs 5A and 5B, etc., and cannot be used, then issues an alarm notification to the entire-unit controller 1 through the I/O memory 4 (step S39), and finishes the sequence of steps.

On the other hand, if the "normal flag" in either EEPROM 5A or 5B is normal (if the judgment in step S36 or S38 is "No"), the unit processor 3 rewrites the "normal flag" in the EEPROM 5A or 5B from "normal" to "abnormal" (step S40), then writes the average value calculated in step S47 to the EEPROM 5A or 5B as the "updated data" of the corresponding wavelength channel (step S41), then writes the present "wavelength channel information" acquired from the I/O memory 4, to the EEPROM 5A or 5B as "wavelength channel information" (step S42), then performs verification on the EEPROM 5A or 5B (step S68), and checks whether it has a memory error (step S69).

If a memory error is detected, the unit processor 3 clears the cycle timer (step S70) and finishes the sequence of steps. If there is no memory error, the unit processor 3 rewrites the "normal flag" in the EEPROM 5A or 5B from "abnormal" to "normal" (step S71), then clears and restarts the cycle timer (steps S72 and S73), and finishes the sequence of steps.

As set forth above, in the case where the transponder unit 2 is provided with two EEPROMs 5A and 5B, verification is performed on the EEPROM 5A or 5B to which data was written. If a memory error is detected, the "normal flag" in the EEPROM 5A or 5B remains abnormal. Therefore, when the tunable E/O converter 6 is reset, or when the EEPROM 5A or 5B is restarted, in the above-described step 2-1 of FIG. 8 (step S31 in FIG. 10) the unit processor 3 checks whether the "normal flag" in the EEPROM 5A or 5B is normal. Therefore, there is no possibility that the unit processor 3 will read out data from the EEPROM 5A or 5B containing a memory error.

[G] Description of a Sixth Modification

Figure 20:
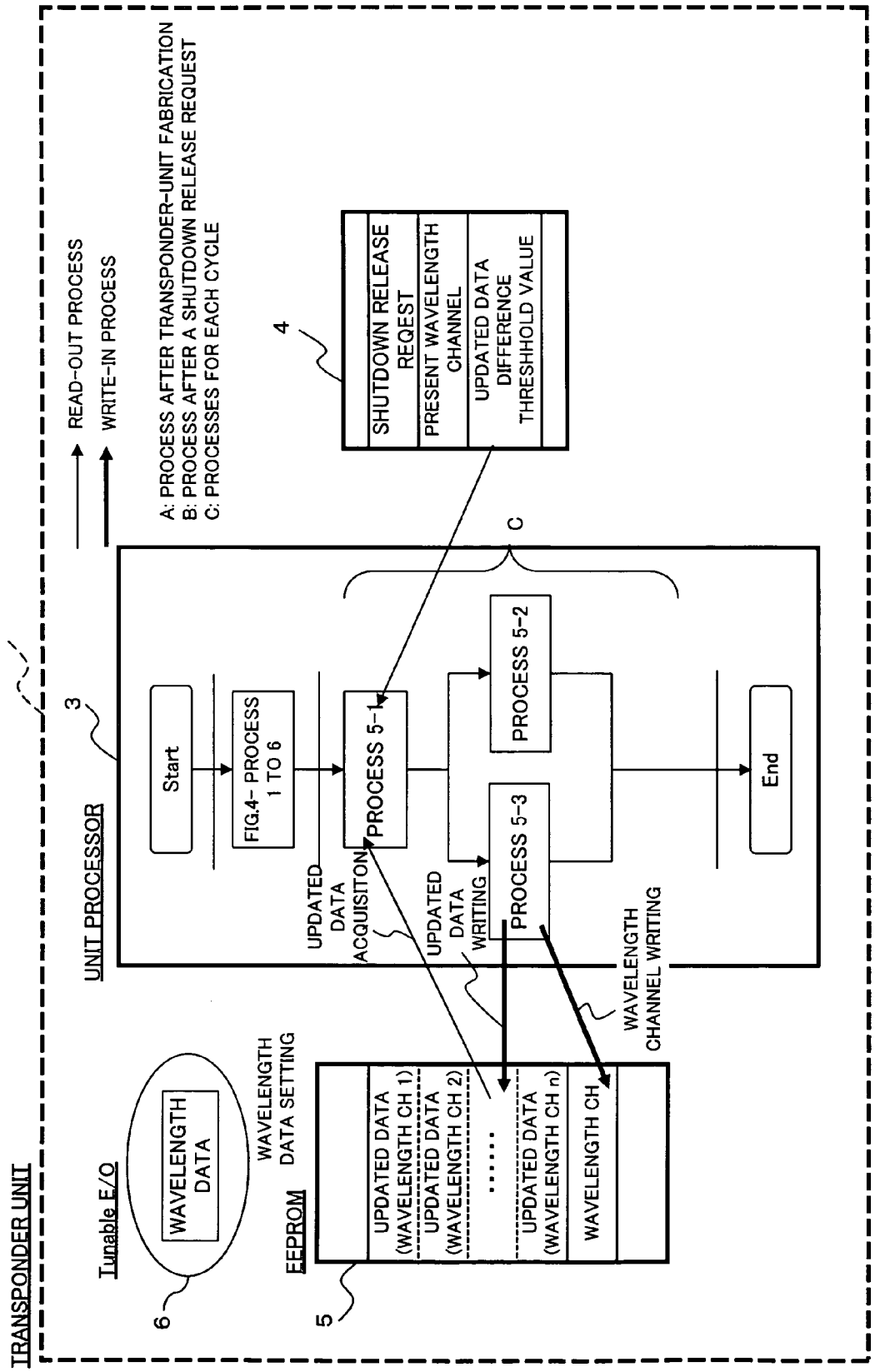
FIG. 20 is a block diagram showing a transponder unit constructed in accordance with a sixth modification of the preferred embodiment shown in FIG. 4.

Referring to FIG. 20, there is shown a transponder unit 2 constructed in accordance with a sixth modification of the preferred embodiment shown in FIG. 4. The transponder unit 2 shown in FIG. 20 is the same in hardware as the construction of FIG. 4, but it differs from that of FIG. 4 in that in addition to the aforementioned processes 1 to 6 shown in FIG. 4, the unit processor 3 executes processes 5-1 to 5-3 as the processes C for each cycle. Unless otherwise noted, the same reference numerals denote the same parts as FIG. 4 or corresponding parts.

Operation of the transponder unit 2 of the sixth modification will hereinafter be described with reference to FIGS. 20 and 21.

In the aforementioned process 7 of FIG. 4, when writing a calculated average value to the EEPROM 5 as the "updated data" of the corresponding wavelength channel, the unit processor 3 of the sixth modification acquires the "updated data" already stored in the EEPROM 5 and compares it with a calculated average value (process 5-1). If a difference between them is within a threshold value, the unit processor 3 does not write the calculated average value to the EEPROM 5 (process 5-2) and finishes the sequence of processes. If it exceeds the threshold value, the unit processor 3 writes the calculated average value and the present "wavelength channel information" to the EEPROM 5 as "wavelength channel information" (process 5-3).

Figure 21:
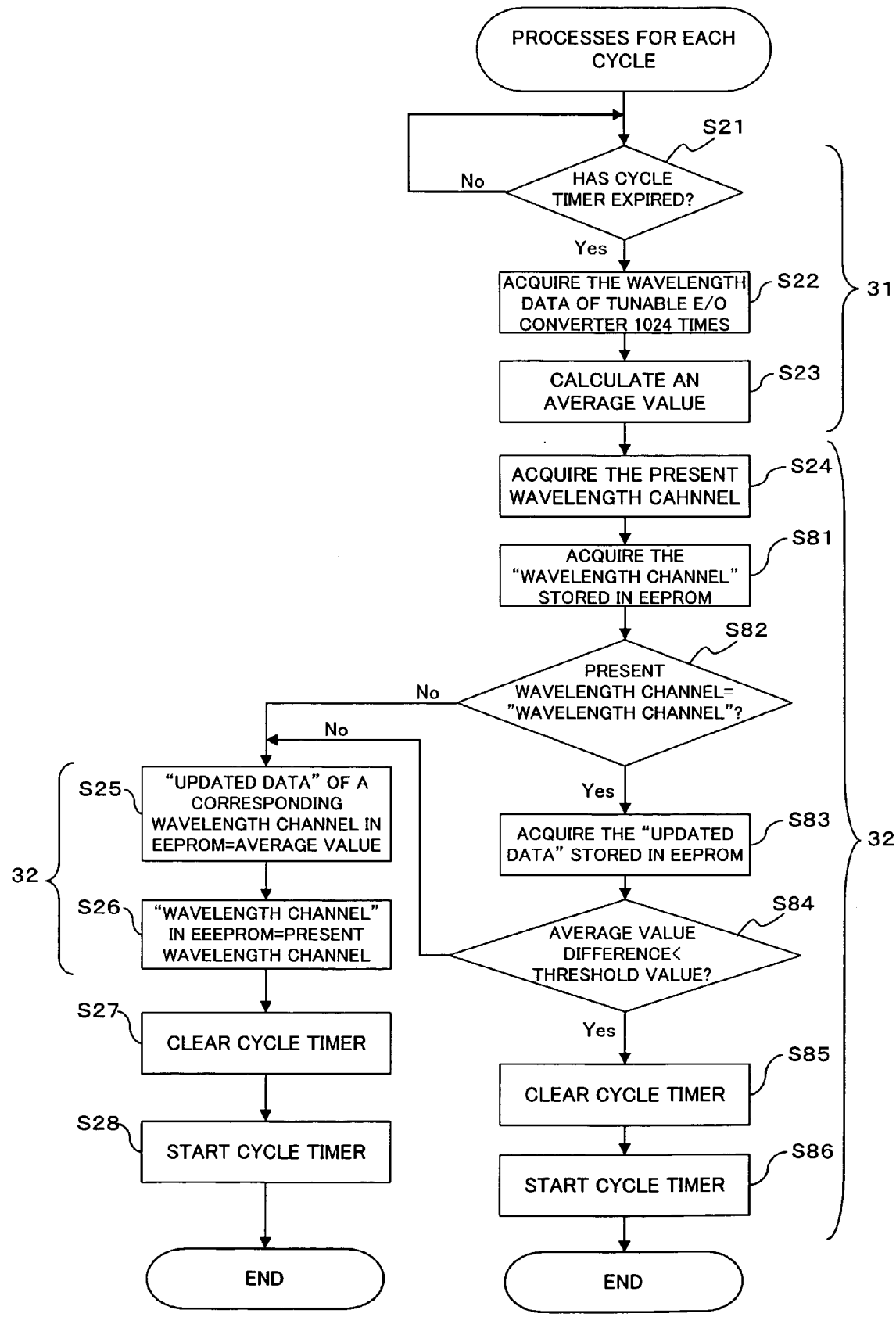
FIG. 21 is a flowchart used to explain the operation (processes for each cycle) of the transponder unit shown in FIG. 20.

More specifically, as shown in FIG. 21, the unit processor 3 monitors whether the cycle timer has expired ("No" route in step S21), as with FIG. 7. If it has expired (if the judgment in step S21 is "Yes"), the unit processor 3 acquires (or samples) the wavelength data of the tunable E/O converter 6 from the data setting register 11 or data updating register 12 a predetermined number of times (e.g., 1024 times) (step S22) and calculates an average value of the acquired data (step S23).

And the unit processor 3 acquires the present "wavelength channel information" set by provisioning, from the I/O memory 4 (step S24), then acquires the "wavelength channel information" of the EEPROM 5 (step S81), and checks whether they coincide with each other (step S82). If they coincide with each other, the unit processor 3 acquires the "updated data" of the corresponding wavelength channel from the EEPROM 5 (step S83), and calculates a difference between the "updated data" and an average value of the "updated data" which was calculated in step S23 in the present cycle and checks whether the difference is less than a predetermined threshold value (step S84). That is, the unit processor 3 of the sixth modification executes step S84 and thereby fulfills one function of the aforementioned wavelength data updater 32 and also functions as a comparison judgment section 326 that compares the wavelength data sampled in the present cycle by the wavelength data sampler 31 with the wavelength data sampled in the previous cycle and then judges whether a difference between the present wavelength data and the previous wavelength data is less than a predetermined threshold value.

And if the difference is less than the threshold value (if the judgment in step S84 is "Yes"), the unit processor 3 (wavelength data updater 32) judges that updating by the above-described average value is unnecessary, and does not perform the writing of the average value to the EEPROM 5 (updating of wavelength data), then clears and restarts the cycle timer (steps S85 and S86), and finishes the sequence of steps.

On the other hand, if the difference exceeds the threshold value, or if there is a change in the operating wavelength channel (if the judgment in step S84 or S82 is "No"), the unit processor 3 writes the aforementioned average value to the EEPROM 5 as the "updated data" of the corresponding wavelength channel (step S25), as with FIG. 7. Also, the unit processor 3 writes the present "wavelength channel information" set by provisioning, to the EEPROM 5 as "wavelength channel information" (step S26), then clears the cycle timer (step S27), then restarts the cycle timer for the processes 6 to 8 in the next cycle (step S28), and finishes the sequence of steps.

With the aforementioned processes and steps, it becomes possible to reduce the number of write operations to the EEPROM 5, whereby it becomes possible to prolong the operating lifetime of the EEPROM 5. In addition, because the number of write operations to the EEPROM 5 is reduced, the possibility of the writing of data to the EEPROM 5 being shut down by an external cause (such as insertion or removal of the transponder unit 2, a power failure, etc.) and the data in the EEPROM 5 being damaged can also be reduced.

[H] Others

While the present invention has been described with reference to the preferred embodiments thereof, the invention is not to be limited to the details given herein, but may be modified within the scope of the invention hereinafter claimed.

For example, while it has been described that the present invention is applied to the tunable E/O converter 6 of the transponder unit 2, the invention is also applicable to units equipped with a tunable laser capable of changing wavelength data as needed by an automatic wavelength correcting function.

In the aforementioned embodiment and modifications, although wavelength data is cyclically sampled, they do not always need to be sampled cyclically. Even in the case where wavelength data is cyclically sampled, the number of wavelength data to be sampled in one cycle is not limited to a plurality of times (1024 times, etc.). For example, it may be at least one time.

As set forth above in detail, the present invention is capable of setting wavelength data to a tunable laser in consideration of age degradation even when the wavelength data of the same or different operating wavelength is reset after the tunable laser is used for a long period of time. Therefore, the invention is able to avoid a PM error, signal disconnection, and a unit failure due to a shift in wavelength, so it is considered to be extremely useful in optical communications.

What is claimed is:

1. A wavelength setting method for a tunable laser which selectively outputs any one of light signals of different wavelengths in dependence on set wavelength data and also corrects said wavelength data automatically to stabilize an output wavelength during operation of said tunable laser, said wavelength setting method comprising:

sampling wavelength data and storing said wavelength data in a memory device, when said tunable laser is operating at any one of said different wavelengths; and setting said wavelength data stored in said memory device to said tunable laser, when a same operating wavelength as a wavelength hitherto operated needs to be reset to said tunable laser, wherein said sampling comprises cyclically sampling wavelength data during the operation of said tunable laser and also acquiring said wavelength data a plurality of times in one cycle, and calculating an average value of said wavelength data acquired a plurality of times in one cycle, and the method further comprises updating the wavelength data stored in said memory device by the calculated average value.

2. The wavelength setting method as set forth in claim 1, wherein said memory device comprises two memories;

said wavelength data sampled during the operation of said tunable laser is written to each of said memories or to one of said memories where wavelength data sampled in a previous cycle was not stored, and normal flag information, which indicates that the writing is normally or abnormally completed, is written to each of said memories or said one memory; and when an operating wavelength of said tunable laser is reset, said normal flag information of each of said memories is checked, one of said memories where said writing is normally completed is selected, and wavelength data in the selected memory is set to said tunable laser.

3. The wavelength setting method as set forth in claim 2, wherein
abnormal completion information is written to each of said memories as said normal flag information during the time said wavelength data is being written to said memory device, and
if said writing is normally completed, said normal flag information is rewritten from said abnormal completion information to normal completion information.

4. The wavelength setting method as set forth in claim 1, wherein
wavelength data sampled in the present cycle is compared with wavelength data sampled in the previous cycle, and
when a difference between the present wavelength data and the previous wavelength data is less than a predetermined threshold value, storing operation of the present wavelength data is not performed on said memory device.

5. The wavelength setting method as set forth in claim 1, wherein
when an operating wavelength of said tunable laser is switched to a different wavelength, wavelength data which is to be set to said tunable laser is calculated based on the wavelength data stored in said memory device, and
said calculated wavelength data is set to said tunable laser.

6. The wavelength setting method as set forth in claim 1, wherein a writing process to said memory device is stopped if said tunable laser is shut down during a time said wavelength data is being sampled.

7. The wavelength setting method as set forth in claim 1, wherein
if data is written to said memory device, it is verified whether said data is normally read out from said memory device, and
when said data cannot be normally read out from said memory device, a notification that said memory device is abnormal is output.

8. The wavelength setting method as set forth in claim 1, further comprising:
inputting a light signal from said tunable laser to an optical device that transmits said light signals of different wavelengths and blocks light signals of wavelengths other than said different wavelengths;
measuring output intensity of said optical device; and
automatically correcting said wavelength data so that the output intensity of said optical device becomes the maximum.

9. A wavelength setting unit for a tunable laser which selectively outputs any one of light signals of different wavelengths in dependence on set wavelength data and also corrects said wavelength data automatically to stabilize an output wavelength during operation of said tunable laser, said wavelength setting unit comprising:
a memory device that stores wavelength data, which are to be set to said tunable laser, according to the wavelengths;
a wavelength data sampler that samples wavelength data when said tunable laser is operating at any one of said different wavelengths;
a wavelength data updater that updates said wavelength data stored in said memory device by said wavelength data sampled by said wavelength data sampler; and
a wavelength setter that sets said wavelength data updated in said memory device by said wavelength data updater to said tunable laser, when a same operating wavelength as a wavelength hitherto operated needs to be reset to said tunable laser wherein
said wavelength data sampler comprises a cyclic sampler that cyclically samples wavelength data during the operation of said tunable laser and also acquires said wavelength data a plurality of times in one cycle, and a wavelength data average calculator that calculates an average value of said wavelength data acquired a plurality of times in one cycle, and
said wavelength data updater is constructed so that it updates wavelength data stored in said memory device by said average value.

10. The wavelength setting unit as set forth in claim 9, wherein
said memory device comprises two memories;
said wavelength data updater comprises
a write controller that writes said wavelength data sampled by said wavelength data sampler to each of said memories or to one of said memories where wavelength data sampled in a previous cycle was not stored, and also writes normal flag information, which indicates that the writing is normally or abnormally completed, to each of said memories or said one memory; and
said wavelength setter comprises
a memory selector that verifies said normal flag information of each of said memories and selects one of said memories where said writing is normally completed, when an operating wavelength of said tunable laser is reset, and
a read-out controller that reads out wavelength data from the memory device selected by said memory selector and sets said wavelength data to said tunable laser.

11. The wavelength setting unit as set forth in claim 9, wherein said wavelength data updater
further comprises a comparison judgment section that compares wavelength data sampled in the present cycle by said wavelength data sampler with wavelength data sampled in the previous cycle and judges whether a difference between the present wavelength data and the previous wavelength data is less than a predetermined threshold value, and
is constructed so that if said comparison judgment section judges that said difference is less than said predetermined threshold value, it does not perform an updating process on said memory device.

12. The wavelength setting unit as set forth in claim 10, wherein said write controller comprises
a flag information updater that writes abnormal completion information to each of said memories as said normal flag information during the time said wavelength data is being written to said memories, and rewrites said normal flag information from said abnormal completion information to normal completion information if said writing is normally completed.

13. The wavelength setting unit as set forth in claim 9, wherein said wavelength setter comprises
a switched wavelength data calculator that calculates wavelength data, which is to be set to said tunable laser, based on wavelength data stored in said memory device, when an operating wavelength of said tunable laser is switched to a different wavelength, and
a switched wavelength setting section that sets said wavelength data calculated by said switched wavelength data calculator to said tunable laser.

14. The wavelength setting unit as set forth in claim 9, wherein said wavelength data updater further comprises
 an updating-process stopping section that stops an updating process being performed on said memory device, if said tunable laser is shut down when said wavelength data sampler is sampling wavelength data.

15. The wavelength setting unit as set forth in claim 9, wherein said wavelength updater comprises
 a memory verification checker that verifies whether data is normally read out from said memory device, if an updating process is performed on said memory device, and
 an abnormal memory notification section that outputs a notification that said memory device is abnormal, when data cannot be normally read out from said memory device by said memory verification checker.

16. The wavelength setting unit as set forth in claim 9, further comprising:
 an optical device that receives a light signal from said tunable laser, transmitting said light signals of different wavelengths, and blocks light signals of wavelengths other than said different wavelengths;
 a measurement device that measures output intensity of said optical device; and
 an automatic corrector that automatically corrects said wavelength data so that the output intensity of said optical device becomes the maximum.

17. A wavelength setting method for a tunable laser which selectively outputs any one of light signals of different wavelengths in dependence on set wavelength data, the method comprising:
 cyclically sampling wavelength data a plurality of times in one cycle during operation of the tunable laser, when the tunable laser is operating at any one of the different wavelengths;
 storing the sampled wavelength data in a memory device;
 calculating an average value of the wavelength data that was cyclically sampled a plurality of times in one cycle;
 updating the wavelength data stored in the memory device by the calculated average value; and
 setting the updated wavelength data stored in the memory device to the tunable laser, when a same operating wavelength as a wavelength hitherto operated needs to be reset to the tunable laser, to thereby stabilize an output wavelength during operation of the tunable laser.

* * * * *

UNITED STATES PATENT AND TRADEMARK OFFICE
CERTIFICATE OF CORRECTION

PATENT NO. : 7,301,973 B2  Page 1 of 1
APPLICATION NO. : 10/967294
DATED : November 27, 2007
INVENTOR(S) : Takuma Shouji et al.

It is certified that error appears in the above-identified patent and that said Letters Patent is hereby corrected as shown below:

Col. 22, line 2, after "laser" insert --,--.

Signed and Sealed this

Third Day of June, 2008

JON W. DUDAS
*Director of the United States Patent and Trademark Office*